US009421868B2

(12) United States Patent
Oyobe et al.

(10) Patent No.: US 9,421,868 B2
(45) **Date of Patent: *Aug. 23, 2016**

(54) ELECTRICAL POWERED VEHICLE AND POWER FEEDING DEVICE FOR VEHICLE

(71) Applicant: TOYOTA JIDOSHA KABUSHIKI KAISHA, Toyota-shi, Aichi-ken (JP)

(72) Inventors: Hichirosai Oyobe, Toyota (JP); Tetsuhiro Ishikawa, Nishikamo-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/683,461

(22) Filed: Apr. 10, 2015

(65) Prior Publication Data

US 2015/0251546 A1 Sep. 10, 2015

Related U.S. Application Data

(63) Continuation of application No. 13/275,925, filed on Oct. 18, 2011, now Pat. No. 9,024,575, which is a continuation of application No. 12/929,445, filed on Jan. 25, 2011, now Pat. No. 9,180,779, which is a continuation of application No. 12/681,332, filed as application No. PCT/JP2008/067269 on Sep. 25, 2008, now Pat. No. 8,008,888.

(30) Foreign Application Priority Data

Oct. 25, 2007 (JP) ................................ 2007-277973

(51) Int. Cl.
*H02J 7/00* (2006.01)
*B60L 5/00* (2006.01)
(Continued)

(52) U.S. Cl.
CPC ............... *B60L 5/005* (2013.01); *B60L 11/123* (2013.01); *B60L 11/14* (2013.01); *B60L 11/182* (2013.01);
(Continued)

(58) Field of Classification Search
CPC .............................. H02J 7/025; Y02T 90/122
USPC ................................................ 320/108, 109
See application file for complete search history.

(56) References Cited

U.S. PATENT DOCUMENTS 4,800,328 A 1/1989 Bolger et al.
5,461,297 A * 10/1995 Crawford ............... H02M 3/28 320/166

(Continued)

FOREIGN PATENT DOCUMENTS

AU 2006269374 C1 1/2007
AU 2007349874 A2 10/2008

(Continued)

OTHER PUBLICATIONS

Kurs et al., "Wireless Power Transfer Via Strongly Coupled Magnetic Resonances," Science, vol. 317, pp. 82-86 (2007).

(Continued)

*Primary Examiner* — Richard Isla Rodas
*Assistant Examiner* — Johali Torres Ruiz
(74) *Attorney, Agent, or Firm* — Oliff PLC

(57) ABSTRACT

A power transfer system transfers electric power from a power feeding device external to a vehicle to a power receiving device mounted on the vehicle in a contactless manner. The power feeding device includes a first reflective wall formed at a rear side of a transmitting coil with respect to a power transferring direction from the transmitting coil, to allow reflection of a magnetic flux output from the transmitting coil in the power transferring direction. The transmitting coil and the first reflective wall are arranged spaced apart from each other. The power receiving device includes a second reflective wall formed at a rear side of a receiving coil with respect to a power receiving direction from the transmitting coil, to allow reflection of a magnetic flux output from the transmitting coil to the receiving coil. The receiving coil and the second reflective wall are arranged spaced apart from each other.

19 Claims, 14 Drawing Sheets

(51) Int. Cl.

| | |
|---|---|
| ***B60L 11/12*** | (2006.01) |
| ***B60L 11/14*** | (2006.01) |
| ***B60L 11/18*** | (2006.01) |
| ***B60M 1/36*** | (2006.01) |
| ***B60M 7/00*** | (2006.01) |
| ***H01F 27/00*** | (2006.01) |
| ***H01F 38/14*** | (2006.01) |
| ***H02J 5/00*** | (2016.01) |
| *H01F 27/38* | (2006.01) |

(52) U.S. Cl.

CPC ................. *B60M 1/36* (2013.01); *B60M 7/003* (2013.01); *H01F 27/006* (2013.01); *H01F 38/14* (2013.01); *H02J 5/005* (2013.01); *B60L 2210/14* (2013.01); *B60L 2210/30* (2013.01); *B60L 2210/40* (2013.01); *B60L 2220/14* (2013.01); *B60L 2240/12* (2013.01); *H01F 27/38* (2013.01); *Y02T 10/6217* (2013.01); *Y02T 10/7005* (2013.01); *Y02T 10/7072* (2013.01); *Y02T 10/7077* (2013.01); *Y02T 10/7088* (2013.01); *Y02T 10/7225* (2013.01); *Y02T 10/7241* (2013.01); *Y02T 90/122* (2013.01); *Y02T 90/127* (2013.01); *Y02T 90/14* (2013.01); *Y02T 90/16* (2013.01)

(56) References Cited

U.S. PATENT DOCUMENTS

| | | | | |
|---|---|---|---|---|
| 5,703,461 | A | 12/1997 | Monoshima et al. | |
| 5,795,849 | A | 8/1998 | Hickman | |
| 5,821,731 | A * | 10/1998 | Kuki | B60L 11/1805 320/108 |
| 5,898,579 | A | 4/1999 | Boys et al. | |
| 5,926,004 | A | 7/1999 | Henze | |
| 6,104,169 | A | 8/2000 | Radys et al. | |
| 6,389,318 | B1 | 5/2002 | Zarinetchi et al. | |
| 6,396,241 | B1 | 5/2002 | Ramos et al. | |
| 6,525,510 | B1 | 2/2003 | Ayano et al. | |
| 8,008,888 | B2 | 8/2011 | Oyobe et al. | |
| 9,024,575 | B2 * | 5/2015 | Oyobe | B60L 5/005 320/108 |
| 2004/0142733 | A1 * | 7/2004 | Parise | B01F 5/0614 455/572 |
| 2005/0068019 | A1 | 3/2005 | Nakamura et al. | |
| 2006/0076922 | A1 | 4/2006 | Cheng et al. | |
| 2006/0181242 | A1 * | 8/2006 | Freed | H02J 7/025 320/109 |
| 2007/0121575 | A1 | 5/2007 | Savry et al. | |
| 2007/0222542 | A1 | 9/2007 | Joannopoulos et al. | |
| 2007/0247005 | A1 | 10/2007 | Tetlow | |
| 2008/0197802 | A1 | 8/2008 | Onishi et al. | |
| 2008/0238364 | A1 | 10/2008 | Weber et al. | |
| 2008/0252254 | A1 * | 10/2008 | Osada | H01M 10/0436 320/108 |
| 2008/0278264 | A1 | 11/2008 | Karalis et al. | |
| 2009/0001929 | A1 | 1/2009 | Postamentier | |
| 2009/0195332 | A1 | 8/2009 | Joannopoulos et al. | |
| 2009/0195333 | A1 | 8/2009 | Joannopoulos et al. | |
| 2009/0224856 | A1 | 9/2009 | Karalis et al. | |
| 2009/0267709 | A1 | 10/2009 | Joannopoulos et al. | |
| 2009/0267710 | A1 | 10/2009 | Joannopoulos et al. | |

FOREIGN PATENT DOCUMENTS

| | | | |
|---|---|---|---|
| AU | 2010200044 | A1 | 1/2010 |
| CA | 2 615 123 | A1 | 1/2007 |
| CA | 2 682 284 | A1 | 10/2008 |
| CN | 101258658 | A | 9/2008 |
| CN | 101682216 | A | 3/2010 |
| EP | 1 902 505 | A2 | 3/2008 |
| EP | 2 130 287 | A1 | 9/2009 |
| IN | 735/DELNP/2008 | | 9/2008 |
| IN | 6195/DELNP/2009 | | 2/2010 |
| JP | A-5-245217 | | 9/1993 |
| JP | A-6-245326 | | 9/1994 |
| JP | A-7-227007 | | 8/1995 |
| JP | A-8-126106 | | 5/1996 |
| JP | A-8-126120 | | 5/1996 |
| JP | A-8-512454 | | 12/1996 |
| JP | A-9-65502 | | 3/1997 |
| JP | A-9-215211 | | 8/1997 |
| JP | A-10-136588 | | 5/1998 |
| JP | A-2000-509955 | | 8/2000 |
| JP | A-2001-8380 | | 1/2001 |
| JP | A-2001-177916 | | 6/2001 |
| JP | A-2002-152996 | | 5/2002 |
| JP | A2003-143711 | | 5/2003 |
| JP | A-2003-224937 | | 8/2003 |
| JP | A-2004-72832 | | 3/2004 |
| JP | A-2004-203178 | | 7/2004 |
| JP | A-2005-27400 | | 1/2005 |
| JP | A-2005-102378 | | 4/2005 |
| JP | A-2005-110412 | | 4/2005 |
| JP | A-2006-174676 | | 6/2006 |
| JP | 2009-501510 | A | 1/2009 |
| KR | 2008-0031398 | A | 4/2008 |
| KR | 2010-0015954 | | 2/2010 |
| RU | 2297928 | C1 | 4/2007 |
| WO | WO 97/42695 | A1 | 11/1997 |
| WO | WO 2006/127185 | A2 | 11/2006 |
| WO | WO 2007/008646 | A2 | 1/2007 |
| WO | WO 2008/032746 | A1 | 3/2008 |
| WO | WO 2008/118178 | A8 | 10/2008 |

OTHER PUBLICATIONS

Nikkei Electronics issued Mar. 26, 2007, “Finally, Power Supply Also Goes Wireless,”.

Jan. 6, 2009 International Search Report issued in International Application No. PCT/JP2008/067269.

Office Action issued in Japanese Application No. 2007-277973.

Office Action issued in Russian Application No. 2010120798 on Mar. 3, 2011.

Notice of Allowance dated Apr. 20, 2011 issued in parent U.S. Appl. No. 12/681,332.

Office Action mailed Dec. 28, 2011 in corresponding U.S. Appl. No. 12/929,445.

Sep. 19, 2012 Office Action issued in U.S. Appl. No. 12/929,445.

Feb. 5, 2014 Office Action issued in U.S. Appl. No. 12/929,445.

Jun. 20, 2014 Office Action issued in U.S. Appl. No. 12/929,445.

Dec. 26, 2014 Office Action issued in U.S. Appl. No. 12/929,445.

Feb. 9, 2012 Office Action issued in U.S. Appl. No. 13/275,925.

Apr. 4, 2012 Office Action issued in U.S. Appl. No. 13/275,925.

Sep. 20, 2012 Office Action issued in U.S. Appl. No. 13/275,925.

Feb. 4, 2014 Office Action issued in U.S. Appl. No. 13/275,925.

Jun. 16, 2014 Office Action issued in U.S. Appl. No. 13/275,925.

Jan. 13, 2015 Notice of Allowance issued in U.S. Appl. No. 13/275,925.

U.S. Appl. No. 12/929,445, filed Jan. 25, 2011.

Jul. 22, 2015 Notice of Allowance issued in U.S. Appl. No. 12/929,445.

May 20, 2015 Notice of Allowance issued in U.S. Appl. No. 13/642,354.

Feb. 8, 2016 Office Action Issued in U.S. Appl. No. 14/683,668.

Jun. 3, 2016 Office Action Issued in U.S. Appl. No. 14/683,668.

* cited by examiner

100
ENGINE
170
MG
162
POWER SPILT DEVICE
172
MG
164
174
154
INVERTER
PWI1
156
INVERTER
PWI2
C2
PL2
NL
152
BOOST CONVERTER
PWC
VEHICLE ECU
180
PL1
C1
NL
SMR1
SE1
SE2
140
SMR2
RECTIFIER
130
120
110

TO RECTIFIER
120
410
VEHICLE
110
240
GROUND
420
230
TO HIGH FREQUENCY POWER DRIVER

100A
ENGINE
170
MG
162
POWER SPILT DEVICE
172
MG
164
174
INVERTER
154
PWI1
INVERTER
156
PWI2
C2
PL2
NL
180A
VEHICLE ECU
Is
Vs
BOOST CONVERTER
152
PWC
C1
PL1
NL
SMR1
SE1
SE2
140
184
182
SMR2
RECTIFIER
130
120
110A (110B,110C)

100B
150
160
120
130
140
190
110
240
250
210
220A
230
260
200A

100B
ENGINE
170
MG
162
POWER SPILT DEVICE
172
MG
164
174
INVERTER
154
PWI1
INVERTER
156
PWI2
C2
PL2
NL
180B
BOOST CONVERTER
152
PWC
VEHICLE ECU
Is
Vs
PL1
C1
NL
PWR
I/F
190
SMR1
SE1
SE2
140
184
182
Is
Vs
SMR2
RECTIFIER
130
120
110

ELECTRICAL POWERED VEHICLE AND POWER FEEDING DEVICE FOR VEHICLE

This is a Continuation of application Ser. No. 13/275,925 filed Oct. 18, 2011 (now U.S. Pat. No. 9,024,575), which in turn is a Continuation of application Ser. No. 12/929,445 filed Jan. 25, 2011 (now U.S. Pat. No. 9,180,779), which is a Continuation of application Ser. No. 12/681,332 filed Apr. 1, 2010 (now U.S. Pat. No. 8,008,888), which is the U.S. National Stage of PCT/JP2008/067269 filed Sep. 25, 2008, which claims the benefit of Japanese Application No. 2007-277973 filed in Japan on Oct. 25, 2007. The disclosure of each of the prior applications is hereby incorporated by reference herein in its entirety.

TECHNICAL FIELD

The present invention relates to an electrical powered vehicle and a power feeding device for a vehicle. Particularly, the present invention relates to the technique of charging a power storage device mounted on an electrical powered vehicle wirelessly from a power source external to the vehicle.

BACKGROUND ART

Great attention is focused on electrical powered vehicles such as an electric vehicle and hybrid vehicle as environment-friendly vehicles. These vehicles incorporate an electric motor for generating a driving force for running, and a rechargeable power storage device for storing electric power to be supplied to the electric motor. A hybrid vehicle refers to a vehicle incorporating an internal combustion engine as a power source, in addition to an electric motor, or a vehicle further incorporating a fuel cell in addition to a power storage device as the direct current power source for driving the vehicle. A hybrid vehicle incorporating an internal combustion engine and an electric motor as the power source is already put into practice.

Among the hybrid vehicles there is known a vehicle that allows charging of the vehicle-mounted power storage device from a power source external to the vehicle, likewise with an electric vehicle. The so-called "plug-in hybrid vehicle" that allows the power storage device to be charged from a general household power supply by connecting the plug socket located at an establishment with the charging inlet provided at the vehicle is known.

As a method for power transfer, attention is recently focused on wireless electrical power transmission not using power supply cords and/or cables for electrical transmission. Three promising approaches of this wireless power transfer technique are, known, i.e. power transfer using electromagnetic induction, power transfer using radio waves, and power transfer through the resonance method.

The resonance method thereof is directed to power transfer taking advantage of the resonance of the electromagnetic field, allowing electric power as high as several kW to be transferred over a relatively long distance (for example, several meters) (refer to Non-Patent Document 1).

Patent Document 1: Japanese Patent Laying-Open No. 2001-8380

Patent Document 2: Japanese Patent Laying-Open No. 8-126106

Non-Patent Document 1: Andre Kurs et al., "Wireless Power Transfer via Strongly Coupled Magnetic Resonances" [online], Jul. 6, 2007, Science, vol. 317, pp. 83-86, [retrieved on Sep. 12, 2007], Internet <URL:http://www.sciencemag.org/cgi/reprint/317/5834/83.pdf>

DISCLOSURE OF THE INVENTION

Problems to be Solved by the Invention

The aforementioned "Wireless Power Transfer via Strongly Coupled Magnetic Resonances" is silent about specific measures in the case where the wireless power transfer approach by the resonance method is applied to the charging of a vehicle-mounted power storage device from a power source external to the vehicle.

Therefore, an object of the present invention is to provide an electrical powered vehicle receiving charging power wirelessly from a power source external to the vehicle by the resonance method, and allowing charging of a vehicle-mounted power storage device.

Another object of the present invention is to provide a power feeding device for a vehicle for wireless power transfer of charging power to an electrical powered vehicle by the resonance method.

Means for Solving the Problems

An electrical powered vehicle of the present invention includes a secondary self-resonant coil, a secondary coil, a rectifier, a power storage device, and an electric motor. The secondary self-resonant coil is configured to be magnetically coupled with a primary self-resonant coil located outside the vehicle by magnetic field resonance, allowing reception of electric power from the primary self-resonant coil. The secondary coil is configured to allow reception of electric power from the secondary self-resonant coil by electromagnetic induction. The rectifier rectifies the electric power received at the secondary coil. The power storage device stores the electric power rectified by the rectifier. The electric motor receives supply of electric power from the power storage device to generate a driving force for the vehicle.

Preferably, the number of windings of the secondary self-resonant coil is set based on the voltage of the power storage device, the distance between the primary self-resonant coil and secondary self-resonant coil, and the resonant frequency of the primary and secondary self-resonant coils.

Preferably, the electrical powered vehicle further includes reflective means. The reflective means is formed at the rear side of the secondary self-resonant coil and secondary coil with respect to the power receiving direction from the primary self-resonant coil, and reflects the magnetic flux output from the primary self-resonant coil towards the secondary self-resonant coil.

Preferably, the electrical powered vehicle further includes an adjustment device. The adjustment device is configured to allow adjustment of the resonant frequency of the secondary self-resonant coil by modifying at least one of the capacitance and inductance of the secondary self-resonant coil.

More preferably, the electrical powered vehicle further includes an electric power detection device, and a control device. The electric power detection device detects the electric power received by the secondary self-resonant coil and the secondary coil. The control device controls the adjustment device such that the electric power detected by the electric power detection device is at a maximum.

Preferably, the electrical powered vehicle further includes an electric power detection device, and a communication device. The electric power detection device detects electric power received by the secondary self-resonant coil and the secondary coil. The communication device is configured to allow transmission of the detection value of electric power detected by the electric power detection device to a power feeding device external to the vehicle, including a primary self-resonant coil.

The secondary self-resonant coil is preferably arranged at a lower portion of the vehicle body.

Furthermore, the secondary self-resonant coil is preferably disposed within a hollow tire of the wheel.

Preferably, a plurality of sets of the secondary self-resonant coil and secondary coil are provided. The plurality of secondary coils are connected to the rectifier, parallel with each other.

Preferably, the electrical powered vehicle further includes a voltage converter. The voltage converter is disposed between the secondary coil and the power storage device to carry out a boosting operation or a down-converting operation based on the voltage of the power storage device.

Preferably, the electrical powered vehicle further includes first and second relays. The first relay is arranged between the power storage device and the electric motor. The second relay is arranged between the power storage device and the secondary coil. When the first relay is turned ON and the electric motor is driven by the electric power of the power storage device, the second relay is also turned ON together with the first relay.

According to the present invention, a power feeding device for a vehicle includes a high frequency power driver, a primary coil, and a primary self-resonant coil. The high frequency power driver is configured to allow conversion of the electric power received from a power source into high frequency power that can achieve magnetic field resonance for transmission to the vehicle. The primary coil receives high frequency power from the high frequency power driver. The primary self-resonant coil is configured to be magnetically coupled with the secondary self-resonant coil mounted on the vehicle by magnetic field resonance, and allow transfer of the high frequency power received from the primary coil by electromagnetic induction to the secondary self-resonant coil.

Preferably, the power feeding device for a vehicle further includes reflective means. The reflective means is formed at the rear side of the primary self-resonant coil and primary coil with respect to the power transferring direction from the primary self-resonant coil for reflecting the magnetic flux output from the primary self-resonant coil in the power transferring direction.

Preferably, the power feeding device for a vehicle further includes a communication device and a control device. The communication device is configured to allow reception of a detection value of reception power transmitted from the vehicle receiving supply of power from the power feeding device for a vehicle. The control device adjusts the frequency of the high frequency power by controlling the high frequency power driver such that the reception power is at a maximum based on the detection value of the reception power received by the communication device.

Preferably, the power feeding device for a vehicle further includes a communication device and a control device. The communication device is configured to allow reception of information transmitted from the vehicle to which power from the power feeding device for a vehicle is supplied. The control device controls the high frequency power driver such that high frequency power is generated according to the number of vehicles receiving supply of electric power from the power feeding device for a vehicle based on the information received by the communication device.

Further preferably, the control device stops the high frequency power driver upon determination that there is no vehicle receiving supply of electric power from the power feeding device for a vehicle.

Preferably, the power feeding device for a vehicle further includes an adjustment device. The adjustment device is configured to allow adjustment of the resonant frequency of the primary self-resonant coil by modifying at least one of the capacitance and inductance of the primary self-resonant coil.

Further preferably, the power feeding device for a vehicle further includes a communication device and a control device. The communication device is configured to allow reception of a detection value of reception power transmitted from the vehicle to which power from the power feeding device for a vehicle is supplied. The control device controls the adjustment device such that the reception power is at a maximum based on the detection value of the reception power received by the communication device.

Preferably, the power feeding device for a vehicle further includes a communication device and a selection device. The communication device is configured to allow reception of a detection value of the reception power received from the vehicle to which power from the power feeding device for a vehicle is supplied. A plurality of sets of the primary self-resonant coil and primary coil are provided. The selection device selects from the plurality of primary coils a primary coil receiving high frequency power from the high frequency power driver and connects the selected primary coil with the high frequency power driver such that the reception power is at a maximum based on the detection value of the reception power received by the communication device.

Preferably, a plurality of sets of the primary self-resonant coil and primary coil are provided. The plurality of primary coils are connected parallel with each other with respect to the high frequency power driver.

Effects of the Invention

In the present invention, the electric power from a power source is converted into high frequency power by the high frequency power driver of the power feeding device for a vehicle, and applied to the primary self-resonant coil by the primary coil. Accordingly, the primary self-resonant coil and the secondary self-resonant coil of the electrical powered vehicle are magnetically coupled by the magnetic field resonance, and electric power is transferred from the primary self-resonant coil to the secondary self-resonant coil. Then, the electric power received by the secondary self-resonant coil is rectified by the rectifier to be stored in the power storage device of the electrical powered vehicle.

According to the present invention, charging power is transferred wirelessly to an electrical powered vehicle from a power source external to the vehicle, allowing charging of a power storage device mounted on the vehicle.

DESCRIPTION OF THE REFERENCE CHARACTERS

Figure 1:
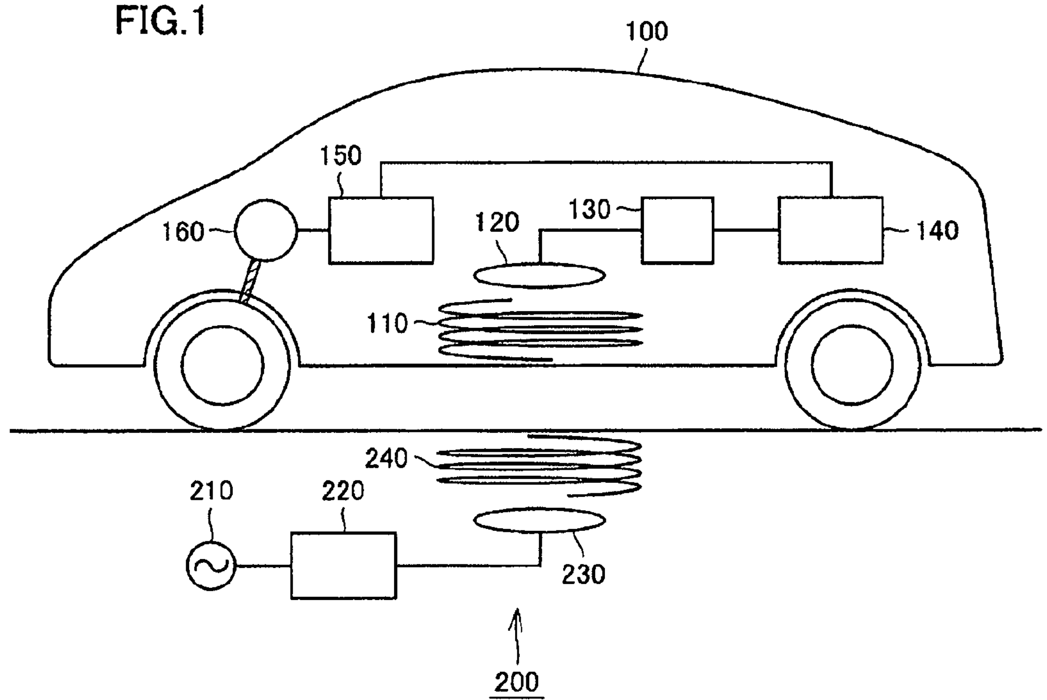
FIG. 1 represents an entire configuration of a charging system to which is applied an electrical powered vehicle according to a first embodiment of the present invention.

100, 100A, 100B, 100B-1, 100B-2 electrical powered vehicle, 110, 110A to 110C, 110-1, 110-2, 110-3, 340 secondary self-resonant coil, 112 variable capacitor, 114 variable capacitive diode, 116-1, 116-2 self-resonant coil, 118 switch, 120, 120-1, 120-2, 120-3, 350 secondary coil, 130 rectifier, 140 power storage device, 150 PCU, 152 boost converter, 154, 156 inverter, 160 motor, 162, 164 motor generator, 170 engine, 172 power split device, 174 driving wheel, 180, 180A, 180B vehicle ECU, 182 voltage sensor, 184 current sensor, 190, 250 communication device, 200, 200A to 200G power feeding device, 210 AC power source, 220, 220A, 220B, 220-1, 220-2, 220-3 high frequency power driver, 230, 230-1, 230-2, 230-3, 320 primary coil, 240, 240A to 240C, 240-1, 240-2, 240-3, 330 primary self-resonant coil; 260, 260A, 260B ECU, 270 selection device, 310 high frequency power source, 360 load, 410, 420 reflective wall, 510 hollow tire, 520 vehicle body, SMRI, SMR2 system main relay, C1, C2 smoothing capacitor, PL1, PL2 positive line, NL negative line.

BEST MODES FOR CARRYING OUT THE INVENTION

Embodiments of the present invention will be described hereinafter in detail with reference to the drawings. The same or corresponding elements in the drawings have the same reference characters allotted, and description thereof will not be repeated.

First Embodiment

FIG. 1 represents an entire configuration of a charging system to which is applied an electrical powered vehicle according to a first embodiment of the present invention. Referring to FIG. 1, the charging system includes an electrical powered vehicle 100, and a power feeding device 200.

Electrical powered vehicle 100 includes a secondary self-resonant coil 110, a secondary coil 120, a rectifier 130, and a power storage device 140. Electrical powered vehicle 100 further includes a power control unit (hereinafter, also referred to as "PCU") 150, and a motor 160.

Secondary self-resonant coil 110 is arranged at a lower portion of the vehicle body. This secondary self-resonant coil 110 is an LC resonant coil having both ends open (non-connected). Secondary self-resonant coil 110 is configured to be magnetically coupled with primary self-resonant coil 240 (described afterwards) of power feeding device 200 by the magnetic field resonance to allow reception of the electric power from primary self-resonant coil 240. Specifically, secondary self-resonant coil 110 has its number of windings set appropriately such that the Q value representing the intensity of resonance between primary self-resonant coil 240 and secondary self-resonant coil 110, the κ value representing the degree of coupling thereof and the like become higher based on the voltage of power storage device 140, the distance between primary self-resonant coil 240 and secondary self-resonant coil 110, the resonant frequency of primary self-resonant coil 240 and secondary self-resonant coil 110, and the like.

Secondary coil 120 is configured to allow reception of electric power from secondary self-resonant coil 110 by electromagnetic induction, and is preferably aligned coaxial with secondary self-resonant coil 110. Secondary coil 120 outputs the electric power received from secondary self-resonant coil 110 towards rectifier 130. Rectifier 130 rectifies AC power of high frequency received from secondary coil 120 for output to power storage device 140. Alternative to rectifier 130, an AC/DC converter converting the AC power of high frequency from secondary coil 120 into the voltage level of power storage device 140 may be employed.

Power storage device 140 is a DC power source that can be charged and recharged, formed of a secondary battery such as lithium ion or nickel hydride. The voltage of power storage device 140 is approximately 200V, for example. Power storage device 140 stores the electric power supplied from rectifier 130, as well as electric power generated by motor 160, as will be described afterwards. Power storage device 140 supplies the stored electric power to PCU 150.

A capacitor of large capacitance may be employed as power storage device 140. Any power buffer is applicable as long as it can temporarily store electric power from rectifier 130 and/or motor 160 and supply the stored electric power to PCU 150.

PCU 150 converts the electric power supplied from power storage device 140 into AC voltage for output to motor 160 to drive motor 160. Further, PCU 150 rectifies the electric power generated by motor 160 for output to power storage device 140, which is charged.

Motor 160 receives the electric power supplied from power storage device 140 via PCU 150 to generate the vehicle driving force, which is provided to the wheel. Motor 160 receives kinetic energy from the wheel or engine not shown to generate electric power. The generated electric power is provided to PCU 150.

Power feeding device 200 includes an AC power source 210, a high frequency power driver 220, a primary coil 230, and a primary self-resonant coil 240.

AC power source 210 is a power source external to the vehicle; for example, a system power source. High frequency power driver 220 converts the electric power received from AC power source 210 into high frequency power that can achieve magnetic field resonance for transmission from primary self-resonant coil 240 to secondary self-resonant coil 110 of the vehicle side, and supplies the converted high frequency power to primary coil 230.

Primary coil 230 is configured to allow power transfer to primary self-resonant coil 240 by electromagnetic induction, and is preferably aligned coaxial with primary self-resonant coil 240. Primary coil 230 outputs the electric power received from high frequency power driver 220 to primary self-resonant coil 240.

Primary self-resonant coil 240 is arranged in the proximity of the ground. This primary self-resonant coil 240 is an LC resonant coil having both ends open, and is configured to be magnetically coupled with secondary self-resonant coil 110 of electrical powered vehicle 100 by magnetic field resonance, and allow power transfer to secondary self-resonant coil 110. Specifically, primary self-resonant coil 240 has its windings set appropriately such that the Q value, the degree of coupling κ and the like become higher based on the voltage of power storage device 140 charged by the electric power supplied from primary self-resonant coil 240, the distance between primary self-resonant coil 240 and secondary self-resonant coil 110, the resonant frequency between primary self-resonant coil 240 and secondary self-resonant coil 110, and the like.

Figure 2:
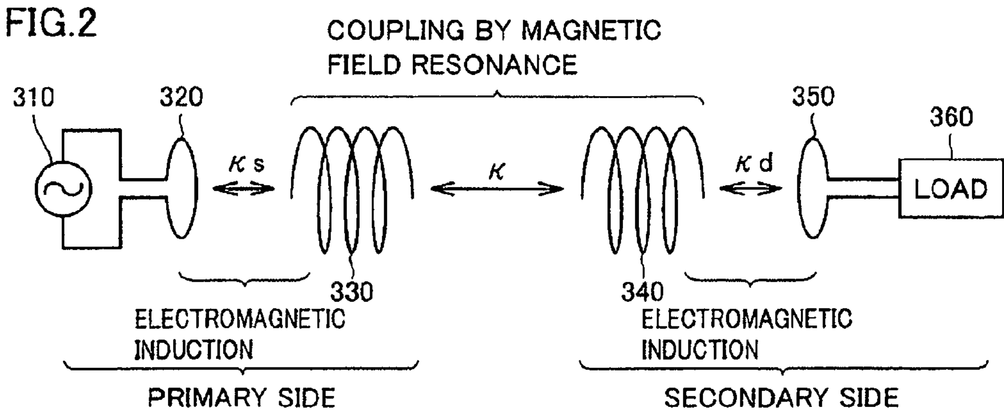
FIG. 2 is a diagram to describe the mechanism of power transfer by the resonance method.

FIG. 2 is a diagram to describe the mechanism of power transfer by the resonance method. Referring to FIG. 2, this resonance method is similar to the resonance of two tuning forks. By the resonance of two LC resonant coils having the same natural frequency via the magnetic field, electric power is transferred wirelessly from one coil to the other coil.

In response to a flow of high frequency power towards primary coil 320 by high frequency power source 310, a magnetic field is built up at primary coil 320 to generate high frequency power at primary self-resonant coil 330 by electromagnetic induction. Primary self-resonant coil 330 functions as an LC resonator based on the coil's inductance and the floating capacitance between the conductor lines. Primary self-resonant coil 330 is magnetically coupled by magnetic field resonance with secondary self-resonant coil 340 similarly functioning as an LC resonator, and having a resonant frequency identical to that of primary self-resonant coil 330 to transfer electric power towards secondary self-resonant coil 340.

The magnetic field built up at secondary self-resonant coil 340 by the electric power received from primary self-resonant coil 330 causes generation of high frequency power by electromagnetic induction at secondary coil 350, which is supplied to load 360.

The corresponding relationship with the elements in FIG. 1 will be described hereinafter. AC power source 210 and high frequency power driver 220 of FIG. 1 correspond to high frequency power source 310 of FIG. 2. Primary coil 230 and primary self-resonant coil 240 of FIG. 1 correspond to primary coil 320 and primary self-resonant coil 330, respectively, of FIG. 2. Secondary self-resonant coil 110 and secondary coil 120 of FIG. 1 correspond to secondary self-resonant coil 340 and secondary coil 350, respectively, of FIG. 2. Rectifier 130 and power storage device 140 of FIG. 1 correspond to load 360 of FIG. 2.

Figure 3:
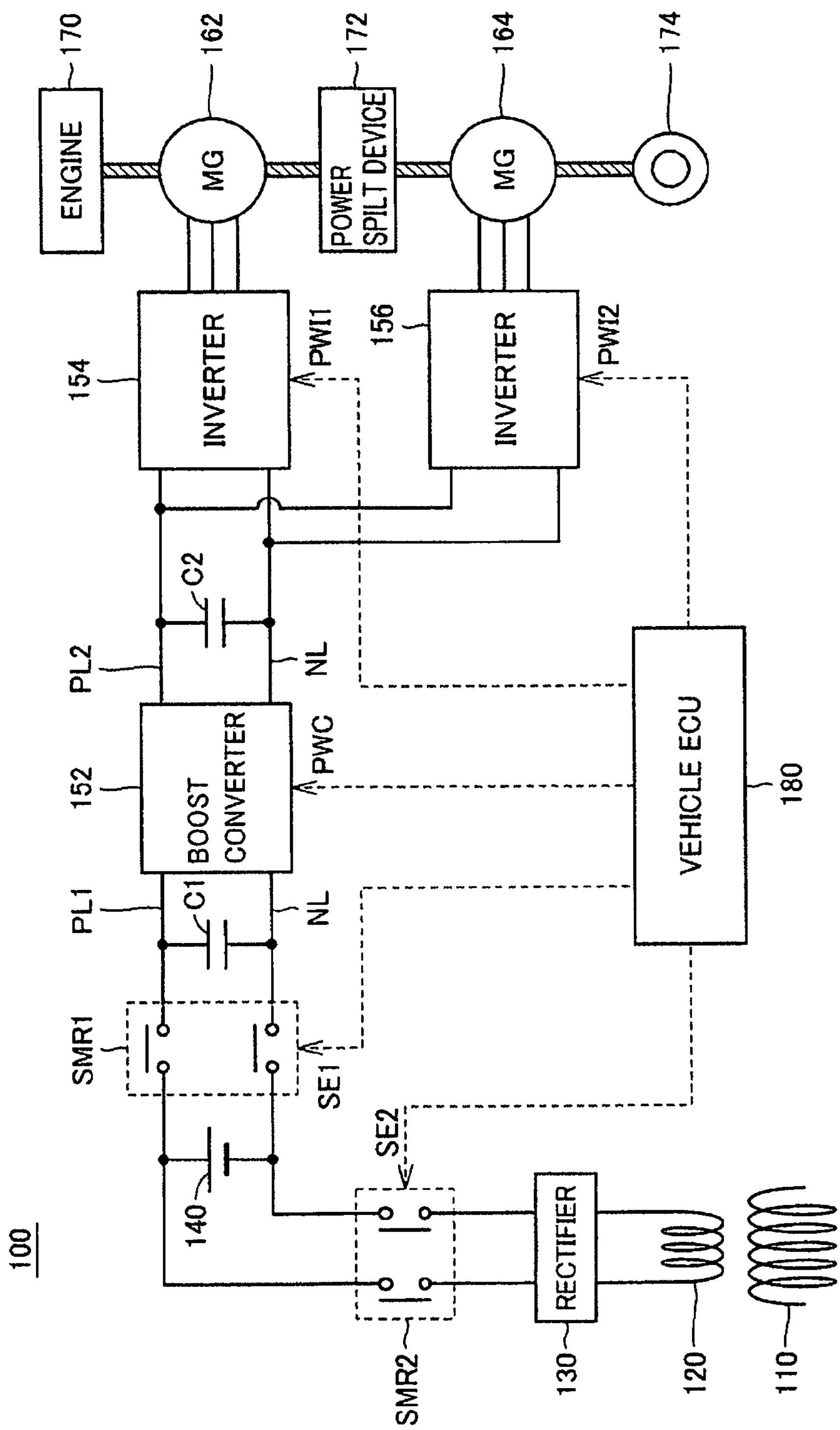
FIG. 3 is a functional block diagram representing an entire configuration of a powertrain of the electrical powered vehicle of FIG. 1.

FIG. 3 is a functional block diagram representing an entire configuration of a powertrain of electrical powered vehicle 100 of FIG. 1. Referring to FIG. 3, electrical powered vehicle 100 includes a power storage device 140, a system main relay SMR1, a boost converter 152, inverters 154 and 156, smoothing capacitors C1, C2, motor generators 162 and 164, an engine 170, a power split device 172, a driving wheel 174, and a vehicle ECU (Electronic Control Unit) 180. Electrical powered vehicle 100 also includes secondary self-resonant coil 110, secondary coil 120, rectifier 130, and system main relay SMR2.

This electrical powered vehicle 100 is a hybrid vehicle incorporating an engine 170 and motor generator 164 as the driving source. Engine 170 and motor generators 162 and 164 are coupled with power split device 172. Electrical powered vehicle 100 runs by the driving force generated by at least one of engine 170 and motor generator 164. The motive power generated by engine 170 is divided into two paths by power split device 172. One path is directed to driving wheel 174 and the other path is directed to motor generator 162.

Motor generator 162 is an AC rotating electric machine formed of, for example, a 3-phase AC synchronous electric motor having a permanent magnet embedded in a rotor. Motor generator 162 generates electric power using the kinetic energy of engine 170 that is divided by power split device 172. For example, when the state of charge (hereinafter, also referred to as SOC) of power storage device 140 becomes lower than a predetermined value, engine 170 is started to cause power generation by motor generator 162 for charging power storage device 140.

Motor generator 164 also is an AC rotating electric machine formed of, for example, a 3-phase AC synchronous electric motor having a permanent magnet embedded in a rotor, similar to motor generator 162. Motor generator 164 generates a driving force using at least one of the electric power stored in power storage device 140 and the electric power generated by motor generator 162. The driving force of motor generator 164 is transmitted to driving wheel 174.

In a braking mode of the vehicle or in an acceleration reducing mode at a downward slope, the mechanical energy stored at the vehicle as a kinetic energy or position energy is used for the rotational drive of motor generator 164 through driving wheel 174, whereby motor generator 164 operates as a power generator. Accordingly, motor generator 164 operates as a regenerative brake converting the running energy into electric power to generate the braking force. The electric power generated by motor generator 164 is stored in power storage device 140.

Motor generators 162 and 164 correspond to motor 160 shown in FIG. 1.

Power split device 172 is formed of a planetary gear set including a sun gear, a pinion gear, a carrier, and a ring gear. The pinion gear engages with the sun gear and ring gear. The carrier supports the pinion gear to allow rotation on its axis, and is coupled to the crankshaft of engine 170. The sun gear is coupled to the rotational shaft of motor generator 162. The ring gear is coupled to the rotational shaft of motor generator 164 and to driving wheel 174.

System main relay SMR1 is disposed between power storage device 140 and boost converter 152. System main relay SMR1 electrically connects power storage device 140 with boost converter 152 when a signal SE1 from vehicle ECU 180 is rendered active, and disconnects the path between power storage device 140 and boost converter 152 when signal SE1 is rendered inactive.

Boost converter 152 responds to a signal PWC from vehicle ECU 180 to boost the voltage output from power storage device 140 for output onto positive line PL2. For example, a DC chopper circuit constitutes this boost converter 152.

Inverters 154 and 156 are provided corresponding to motor generators 162 and 164, respectively. Inverter 154 drives motor generator 162 based on a signal PWI1 from vehicle ECU 180. Inverter 156 drives motor generator 164 based on a signal PWI2 from vehicle ECU 180. A 3-phase bridge circuit, for example, constitutes inverters 154 and 156.

Boost converter 152 and inverters 154 and 156 correspond to PCU 150 of FIG. 1.

Secondary self-resonant coil 110, secondary coil 120, and rectifier 130 are as described with reference to FIG. 1. System main relay SMR2 is disposed between rectifier 130 and power storage device 140. System main relay SMR2 electrically connects power storage device 140 with rectifier 130 when a signal SE2 from vehicle ECU 180 is rendered active, and disconnects the path between power storage device 140 and rectifier 130 when signal SE2 is rendered inactive.

Vehicle ECU 180 generates signals PWC, PWI1 and PWI2 to drive boost converter 152, motor generator 162, and motor generator 164, respectively, based on the accelerator pedal position, vehicle speed, and signals from various sensors. The generated signals PWC, PWI1 and PWI2 are output to boost converter 152, inverter 154, and inverter 156, respectively.

In a vehicle running mode, vehicle ECU 180 renders signal SE1 active to turn on system main relay SMR1, and renders signal SE2 inactive to turn off system main relay SMR2.

In a charging mode of power storage device 140 from AC power source 210 external to the vehicle (FIG. 1) by means of secondary self-resonant coil 110, secondary coil 120 and rectifier 130, vehicle ECU 180 renders signal SE1 inactive to turn off system main relay SMR1, and renders signal SE2 active to turn on system main relay SMR2.

In electrical powered vehicle. 100, system main relays SMR1 and SMR2 are turned off and on, respectively, in a charging mode of power storage device 140 from external AC power source 210 (FIG. 1). The charging power of high frequency received by secondary self-resonant coil 110 magnetically coupled with primary self-resonant coil 240 (FIG. 1) of power feeding device 200 by magnetic field resonance is transferred to secondary coil 120 by electromagnetic induction, rectified by rectifier 130, and then supplied to power storage device 140.

In order to improve the efficiency of power transfer by magnetic field resonance, at least one of power feeding device 200 and electrical powered vehicle 100 may have a reflective wall provided to reflect the magnetic flux.

Figure 4:
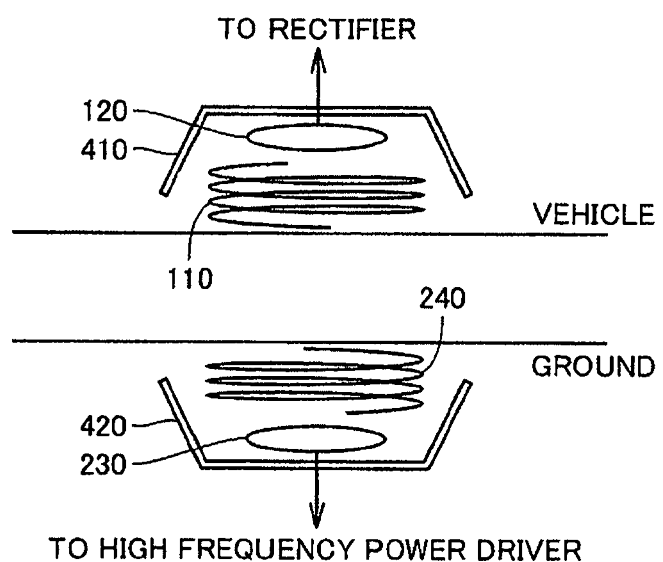
FIG. 4 represents an exemplified arrangement of a reflective wall.

FIG. 4 represents an exemplified arrangement of such a reflective wall. FIG. 4 is an enlarged view around secondary self-resonant coil 110 and secondary coil 120 of electrical powered vehicle 100, and primary coil 230 and primary self-resonant coil 240 of power feeding device 200.

Referring to FIG. 4, electrical powered vehicle 100 has a reflective wall 410 of low magnetic permeability provided at the rear side of secondary self-resonant coil 110 and secondary coil 120 with respect to the electric power receiving direction from primary self-resonant coil 240, so as to surround secondary self-resonant coil 110 and secondary coil 120, allowing the magnetic flux output from primary self-resonant coil 240 to be reflected towards secondary self-resonant coil 110.

Power feeding device 200 has a reflective wall 420 of low magnetic permeability provided at the rear side of primary self-resonant coil 240 and primary coil 230 with respect to the power transferring direction from primary self-resonant coil 240 so as to surround primary self-resonant coil 240 and primary coil 230, allowing the magnetic flux output from primary self-resonant coil 240 to be reflected towards the power transferring direction.

Reflective wall 410 of the vehicle side also serves to block magnetic leakage into the compartment and towards the vehicle-mounted electrical equipment.

In the first embodiment, the electric power from AC power source 210 is converted into high frequency power by high frequency power driver 220 of power feeding device 200, and applied to primary self-resonant coil 240 by primary coil 230. Accordingly, primary self-resonant coil 240 is magnetically coupled with secondary self-resonant coil 110 of electrical powered vehicle 100 by magnetic field resonance, whereby electric power is transferred from primary self-resonant coil 240 to secondary self-resonant coil 110. The electric power received by secondary self-resonant coil 110 is rectified by rectifier 130 to be supplied to power storage device 140 of electrical powered vehicle 100. According to the present first embodiment, the charging power from AC power source 210 external to the vehicle is transferred wirelessly to electrical powered vehicle 100 to allow charging of power storage device 140 mounted thereon.

By providing reflective walls 410 and 420 formed of members of low magnetic permeability, the efficiency of power transfer by magnetic field resonance can be improved in the first embodiment. Moreover, magnetic leakage into the compartment and towards the vehicle-mounted equipment can be blocked by reflective wall 410.

Second Embodiment

It is to be noted that the distance between the power feeding device and vehicle may vary depending upon the state of the vehicle (loading state, air pressure of tire, and the like). The change in the distance between the primary self-resonant coil of the power feeding device and the secondary self-resonant coil of the vehicle causes a change in the resonant frequency of the primary self-resonant coil and secondary self-resonant coil. In this context, the second embodiment has the resonant frequency of the secondary self-resonant coil on part of the vehicle variable.

Figure 5:
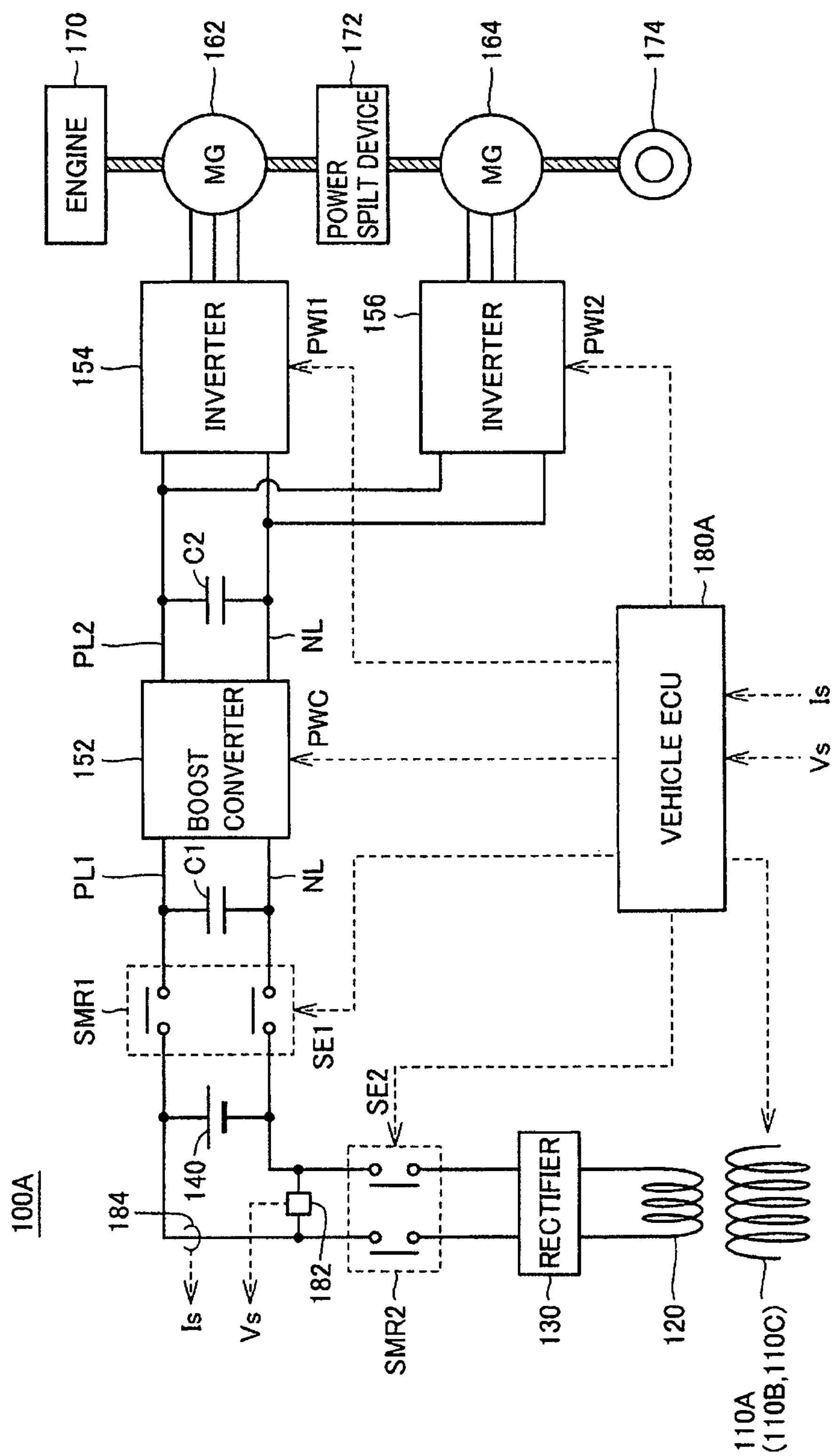
FIG. 5 is a functional block diagram representing an entire configuration of a powertrain of an electrical powered vehicle according to a second embodiment.

FIG. 5 is a functional block diagram representing an entire configuration of a powertrain of an electrical powered vehicle 100A of the second embodiment. Referring to FIG. 5, electrical powered vehicle 100A is based on the configuration of electrical powered vehicle 100 shown in FIG. 3, additionally including a voltage sensor 182 and a current sensor 184, and also including a secondary self-resonant coil 110A and vehicle ECU 180A instead of secondary self-resonant coil 110 and vehicle ECU 180, respectively.

Secondary self-resonant coil 110A is configured to allow the capacitance of the coil to be modified based on a control signal from vehicle ECU 180A. Secondary self-resonant coil 110A can change the LC resonant frequency by modifying the capacitance.

Figure 6:
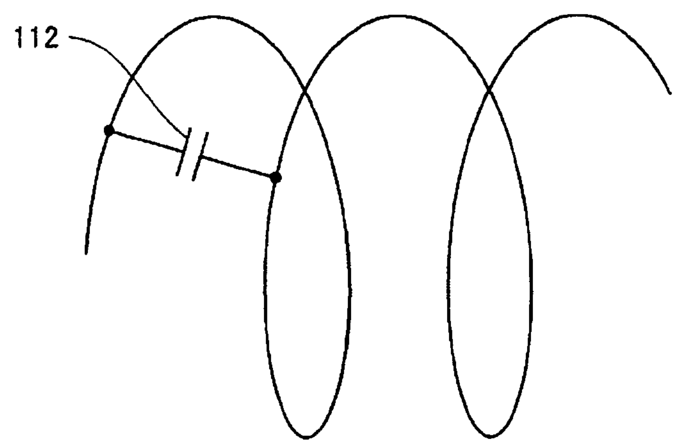
FIG. 6 represents an exemplified configuration of the secondary self-resonant coil of FIG. 5.

FIG. 6 represents an exemplified configuration of secondary self-resonant coil 110A of FIG. 5. Referring to FIG. 6, secondary self-resonant coil 110A includes a variable capacitor connected between conductor lines. Variable capacitor 112 has a variable capacitance based on a control signal from vehicle ECU 180A (FIG. 5). By altering the capacitance thereof, the capacitance of secondary self-resonant coil 110A is rendered variable. As compared to the case where a variable capacitor 112 is not provided so that the capacitance of the secondary self-resonant coil will be determined by the floating capacitance between the conductor lines, the capacitance of secondary self-resonant coil 110A can be modified by altering the capacitance of variable capacitor 112 connected between the conductor lines. Therefore, the LC resonant frequency of secondary self-resonant coil 110A can be modified by altering the capacitance of variable capacitor 112.

Referring to FIG. 5 again, voltage sensor 182 detects a voltage Vs of power storage device 140 to provide the detection value to vehicle ECU 180A. Current sensor 184 detects a current Is flowing from rectifier 130 to power storage device 140 to output the detection value to vehicle ECU 180A.

In a charging mode of power storage device 140 from power feeding device 200 (FIG. 1) external to the vehicle, vehicle ECU 180A calculates the charging power of power storage device 140 based on each detection value from voltage sensor 182 and current sensor 184. Vehicle ECU 180A adjusts the LC resonant frequency of secondary self-resonant coil 110A by adjusting the capacitance of variable capacitor 112 (FIG. 6) of secondary self-resonant coil 110A such that the charging power is at a maximum.

Thus, in the present second embodiment, the LC resonant frequency of secondary self-resonant coil 110A can be adjusted by variable capacitor 112. The LC resonant frequency of secondary self-resonant coil 110A is adjusted by vehicle ECU 180A such that the charging power of power storage device 140 is at a maximum. According to the present second embodiment, the efficiency of power transfer from power feeding device 200 to electrical powered vehicle 100A can be maintained even if the state of the vehicle (loading state, air pressure of tire, and the like) changes.

[First Modification of Second Embodiment]

A variable capacitive diode may be employed instead of variable capacitor 112 in order to adjust the LC resonant frequency of the secondary self-resonant coil.

Figure 7:
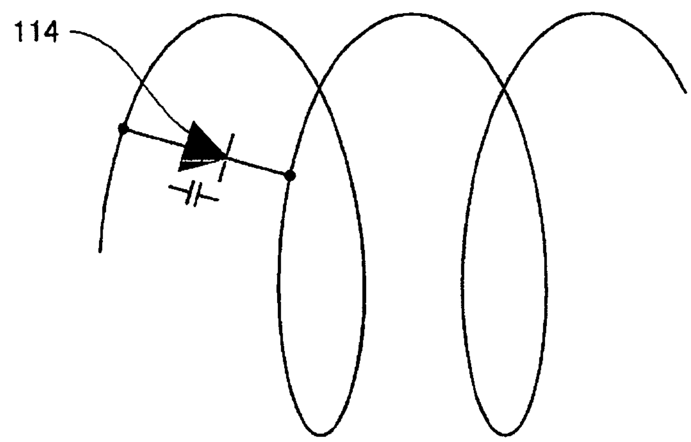
FIG. 7 represents an exemplified configuration of a secondary self-resonant coil according to a first modification of the second embodiment.

FIG. 7 represents an example of a configuration of a secondary self-resonant coil according to a first modification of the second embodiment. Referring to FIG. 7, a secondary self-resonant coil 110B includes a variable capacitive diode 114 connected between conductor lines. Variable capacitive diode 114 has a capacitance that is variable based on a control signal from vehicle ECU 180A (FIG. 5) to render the capacitance of secondary self-resonant coil 110B variable by modifying the capacitance thereof, likewise with variable capacitor 112.

Vehicle ECU 180A adjusts the capacitance of variable capacitive diode 114 of secondary self-resonant coil 110B to adjust the LC resonant frequency of secondary self-resonant coil 110B such that the charging power supplied from power feeding device 200 external to the device (FIG. 1) towards power storage device 140 is at a maximum.

An advantage similar to that of the second embodiment described above can be achieved by the present first modification.

[Second Modification of Second Embodiment]

The second embodiment and first modification thereof were described based on a secondary self-resonant coil having a variable capacitance to allow adjustment of the resonant frequency of the secondary self-resonant coil. Alternatively, the inductance of the secondary self-resonant coil may be rendered variable.

Figure 8:
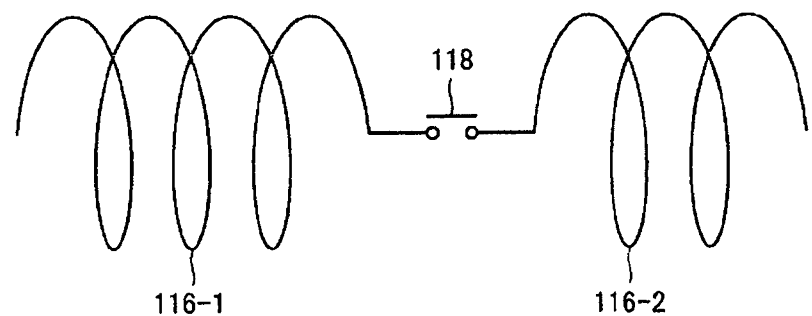
FIG. 8 represents an exemplified configuration of a secondary self-resonant coil according to a second modification of the second embodiment.

FIG. 8 represents an example of a configuration of a secondary self-resonant coil according to a second modification of the second embodiment. Referring to FIG. 8, a secondary self-resonant coil 110C includes self-resonant coils 116-1 and 116-2, and a switch 118 connected between self-resonant coils 116-1 and 116-2. Switch 118 is turned on/off based on a control signal from vehicle ECU 180A (FIG. 5).

When switch 118 is turned on, self-resonant coils 116-1 and 116-2 are coupled, so that the inductance of overall secondary self-resonant coil 110C becomes greater. Therefore, the LC resonant frequency of secondary self-resonant coil 110C can be modified by turning switch 118 on/off.

Vehicle ECU 180A turns switch 118 of secondary self-resonant coil 110C on or off to adjust the LC resonant frequency of secondary self-resonant coil 110C based on the charging power supplied from power feeding device 200 (FIG. 1) external to the vehicle to power storage device 140.

Although the above description is based on a secondary self-resonant coil 110C including two self-resonant coils 116-1 and 116-2 and one switch 118, the LC resonant frequency of secondary self-resonant coil 110C can be adjusted more finely by providing more self-resonant coils and a corresponding switch for connection/disconnection thereof.

An advantage similar to that of the second embodiment set forth above can be achieved by the second modification.

Third Embodiment

Secondary self-resonant coil 110 has both ends open (non-connected), and the influence of an obstacle on the magnetic field resonance is low. In this context, the secondary self-resonant coil is provided inside a hollow tire of the wheel in the third embodiment.

An entire configuration of the powertrain of an electrical powered vehicle according to the third embodiment is similar to that of electrical powered vehicle 100 shown in FIG. 3.

Figure 9:
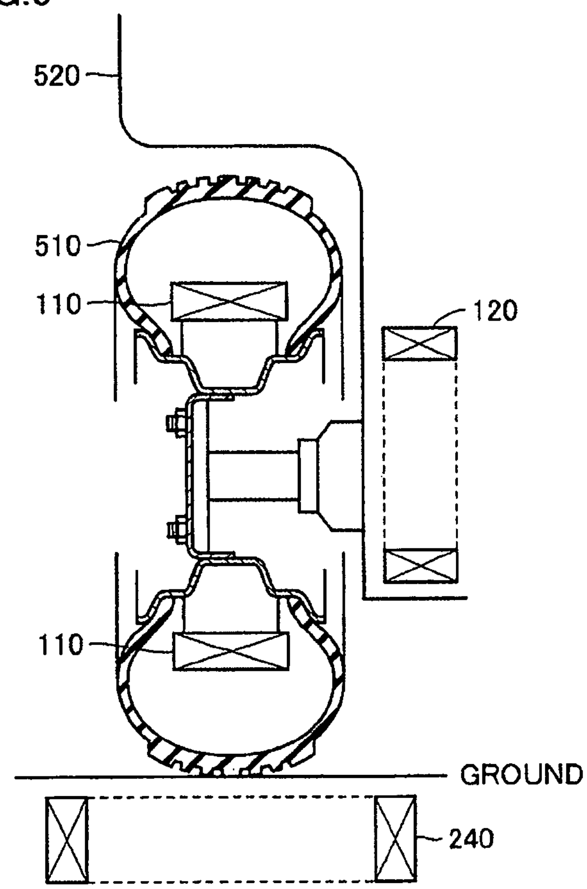
FIG. 9 is a vertical cross sectional view of the wheel and its neighborhood of an electrical powered vehicle according to a third embodiment.

FIG. 9 is a vertical sectional view of the wheel of the electrical powered vehicle and the neighborhood thereof according to the third embodiment. Referring to FIG. 9, the wheel is formed of a hollow tire 510. Inside hollow tire 510, a secondary self-resonant coil 110 coaxial with the wheel is provided. Secondary self-resonant coil 110 is fixedly attached to the wheel. In the proximity of the wheel in a vehicle body 520, a secondary coil 120 is disposed, allowing power reception by electromagnetic induction from secondary self-resonant coil 110 provided in hollow tire 510.

When the vehicle is brought to a halt such that the wheel having secondary self-resonant coil 110 incorporated in hollow tire 510 is located above primary self-resonant coil 240 of the power feeding device, secondary self-resonant coil 110 in hollow tire 510 is magnetically coupled with primary self-resonant coil 240 by the magnetic field resonance. Electric power is transferred from primary self-resonant coil 240 towards secondary self-resonant coil 110 in hollow tire 510. The electric power received by secondary self-resonant coil 110 is transferred by electromagnetic induction to secondary coil 120 disposed in the proximity of the wheel, and then supplied to power storage device 140 not shown.

In the third embodiment, the axes of secondary self-resonant coil 110 and primary self-resonant coil 240 do not match and are not parallel with each other. However, the axes of secondary self-resonant coil 110 and primary self-resonant coil 240 do not necessarily have to match or be parallel in power transfer by magnetic filed resonance.

The third embodiment is advantageous in that the interior of a hollow tire can be utilized efficiently as the space for arrangement of secondary self-resonant coil 110.

Fourth Embodiment

In the fourth embodiment, a plurality of sets of the secondary self-resonant coil and secondary coil are provided on part of the vehicle. Accordingly, the electric power transferred from the power feeding device can be received reliably and sufficiently even if the halting position of the vehicle is deviated from a defined position.

Figure 10:
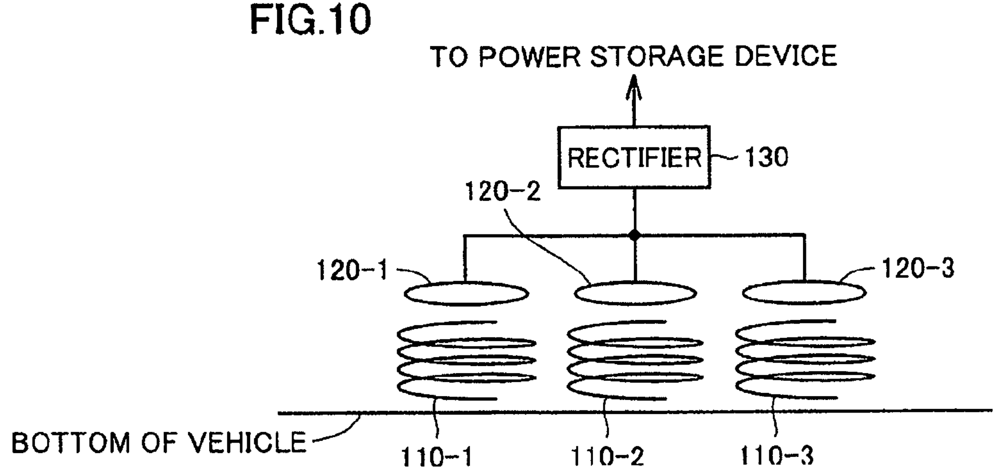
FIG. 10 represents a configuration around a power receiving region of an electrical powered vehicle according to a fourth embodiment.

FIG. 10 represents a configuration in the proximity of the power receiving region of the electrical powered vehicle in the fourth embodiment. FIG. 10 is based on an example in which there are, but not limited to, three sets of secondary self-resonant coils and secondary coils.

Referring to FIG. 10, the electrical powered vehicle includes secondary self-resonant coils 110-1, 110-2, and 110-3, secondary coils 120-1, 120-2, and 120-3, and a rectifier 130. Secondary self-resonant coils 110-1, 110-2, and 110-3 are disposed parallel to the bottom face of the vehicle at the lower portion of the vehicle body. Secondary coils 120-1, 120-2, and 120-3 are provided corresponding to secondary self-resonant coils 110-1, 110-2, and 110-3, respectively, and connected parallel to each other with respect to rectifier 130.

The remaining configuration of the electrical powered vehicle in the fourth embodiment is identical to that of the first or second embodiment.

Since a plurality of sets of secondary self-resonant coils and secondary coils are provided in the fourth embodiment, the electric power transferred from the power feeding device can be received reliably and sufficiently even if the halting position of the vehicle is deviated from a defined position.

According to the fourth embodiment, any leaking power not received at secondary self-resonant coil 110-2 identified as the main power receiving coil can be received by another secondary self-resonant coil in the case where the vehicle is brought to a halt at a defined position with respect to secondary self-resonant coil 110-2. Therefore, the power transfer efficiency can be improved.

[First Modification of Fourth Embodiment]

The above description is based on the case where a set of a secondary self-resonant coil and secondary coil is provided in plurality. Leakage of the power transmission can be reduced by just providing a plurality of secondary self-resonant coils.

Figure 11:
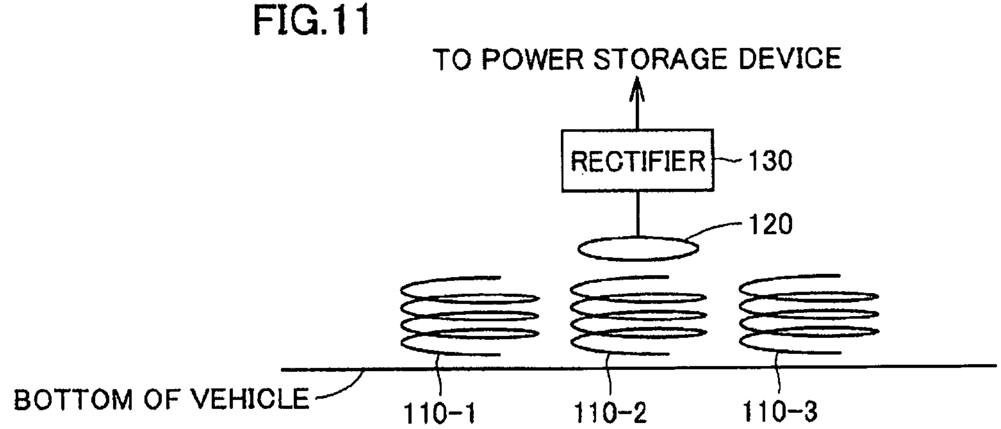
FIG. 11 represents a configuration around a power receiving region of an electrical powered vehicle according to a first modification of the fourth embodiment.

FIG. 11 represents a configuration in the proximity of the power receiving region of the electrical powered vehicle according to a first modification of the fourth embodiment. FIG. 11 is based on an example in which there are, but not limited to, three secondary self-resonant coils.

Referring to FIG. 11, the electrical powered vehicle includes secondary self-resonant coils 110-1, 110-2, and 110-3, a secondary coil 120, and a rectifier 130. Secondary self-resonant coils 110-1, 110-2, and 110-3 are arranged parallel to the bottom face of the vehicle at the lower portion of the body. Secondary coil 120 is provided corresponding to secondary self-resonant coil 110-2, and is connected to rectifier 130.

The remaining configuration of the electrical powered vehicle according to the first modification of the fourth embodiment is similar to that of the first or second embodiment.

In the first modification of the fourth embodiment, the power transmission efficiency can be improved since any leaking power not received at secondary self-resonant coil 110-2 can be received at another secondary self-resonant coil.

[Second Modification of Fourth Embodiment]

Although only a plurality of secondary self-resonant coils are provided in the above-described first modification, leakage of the transferred power can also be reduced by providing a plurality of secondary coils instead.

Figure 12:
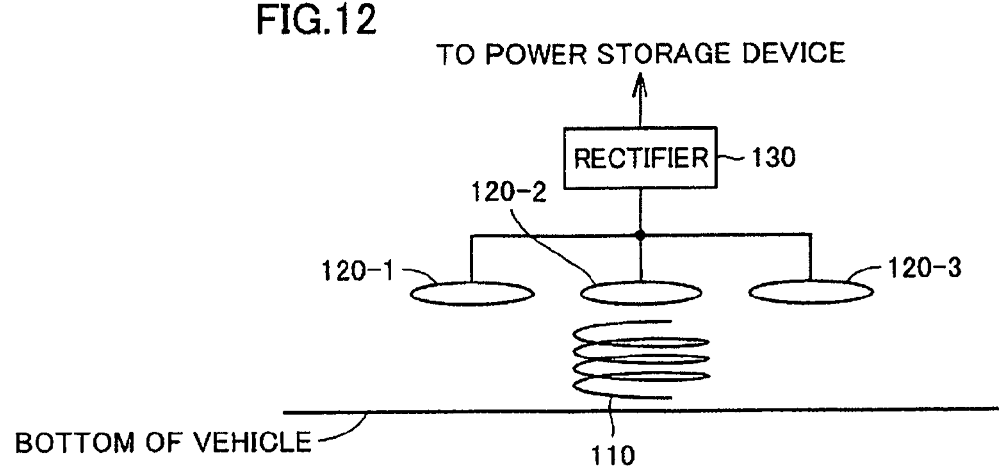
FIG. 12 represents a configuration around a power receiving region of an electrical powered vehicle according to a second modification of the fourth embodiment.

FIG. 12 represents a configuration in the proximity of the power receiving region of the electrical powered vehicle according to a second modification of the fourth embodiment. FIG. 12 is based on an example in which there are, but not limited to, three secondary coils.

Referring to FIG. 12, the electrical powered vehicle includes a secondary self-resonant coil 110, secondary coils 120-1, 120-2, and 120-3, and a rectifier 130. Secondary coil 120-2 is provided corresponding to secondary self-resonant coil 110. Secondary coils 120-1, 120-2, and 120-3 are arranged parallel to the bottom face of the vehicle at the lower portion of the body, and parallel to each other with respect to rectifier 130.

The remaining configuration of the electrical powered vehicle according to the second modification of the fourth embodiment is similar to that of the first or second embodiment.

In the second modification of the fourth embodiment, the power transmission efficiency can be improved since any leaking power not received at secondary coil 120-2 can be received at another secondary coil.

Fifth Embodiment

As mentioned above, variation in the distance between the primary self-resonant coil of the power feeding device and the secondary self-resonant coil of the vehicle will cause change in the resonant frequency of the primary self-resonant coil and secondary self-resonant coil. In the fifth embodiment, the power receiving state of the electrical powered vehicle is transmitted to the power feeding device, and the frequency of the high frequency power, i.e. resonant frequency, is adjusted at the power feeding device such that the receiving electric power of the electrical powered vehicle is at a maximum.

Figure 13:
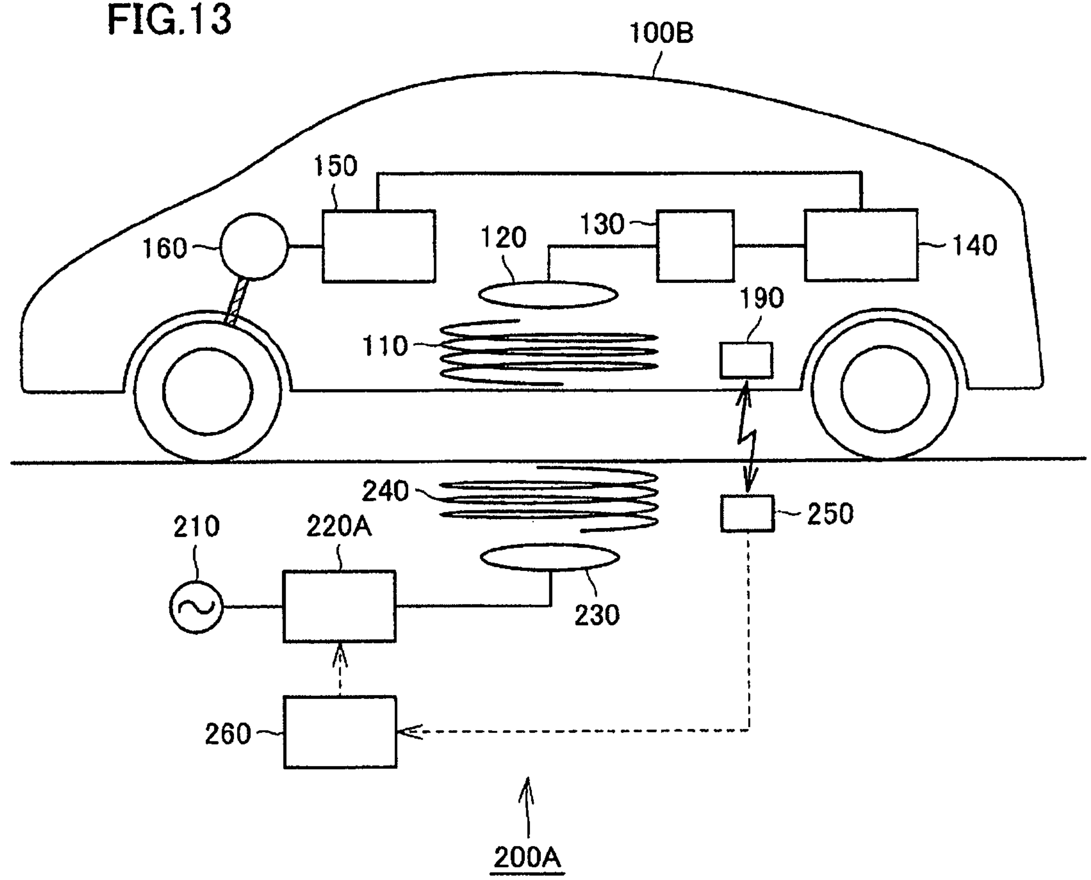
FIG. 13 represents an entire configuration of a charging system to which is applied an electrical powered vehicle according to a fifth embodiment.

FIG. 13 represents an entire configuration of a charging system to which the electrical powered vehicle of the fifth embodiment is applied. Referring to FIG. 13, the charging system includes an electrical powered vehicle 100B, and a power feeding device 200A.

Electrical powered vehicle 100B is based on the configuration of electrical powered vehicle 100 shown in FIG. 1, and additional includes a communication device 190. Communication device 190 is a communication interface for wireless communication with a communication device 250 provided at power feeding device 200.

Power feeding device 200A is based on the configuration of power feeding device 200 shown in FIG. 1, and additionally includes a communication device 250 and an ECU 260, as well as a high frequency power driver 220A instead of high frequency power driver 220. Communication device 250 is a communication interface for wireless communication with communication device 190 provided at electrical powered vehicle 100B. ECU 260 controls high frequency power driver 220A based on the information from electrical powered vehicle 100B received by communication device 250.

Figure 14:
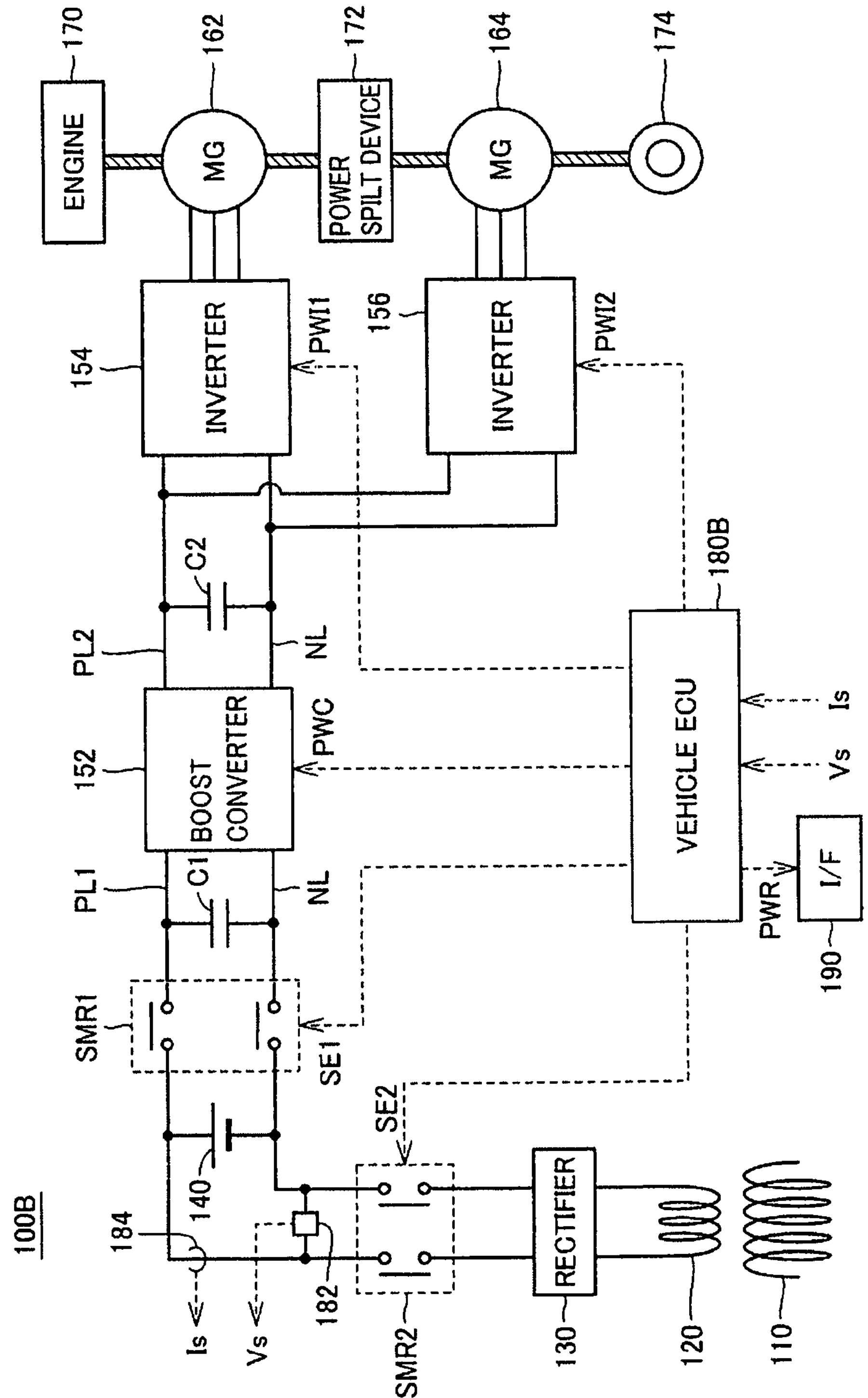
FIG. 14 is a functional block diagram representing an entire configuration of a powertrain of the electrical powered vehicle of FIG. 13.

FIG. 14 is a functional block diagram representing an entire configuration of a powertrain of electrical powered vehicle 100B shown in FIG. 13. Referring to FIG. 14, electrical powered vehicle 100B is based on the configuration of electrical powered vehicle 100 shown in FIG. 3, and additionally includes a voltage sensor 182, a current sensor 184, and communication device 190, as well as a vehicle ECU 180B instead of vehicle ECU 180.

In a charging mode of power storage device 140 from power feeding device 200A (FIG. 13) external to the vehicle, vehicle ECU 180B calculates a charging power PWR of power storage device 140 based on respective detection values from voltage sensor 182 and current sensor 184, and provides the calculated charging power PWR to communication device 190. Communication device 190 transmits charging power PWR received from vehicle ECU 180B by radio towards power feeding device 200A external to the vehicle.

The remaining configuration of electrical powered vehicle 100E is similar to that of electrical powered vehicle 100 shown in FIG. 3.

Figure 15:
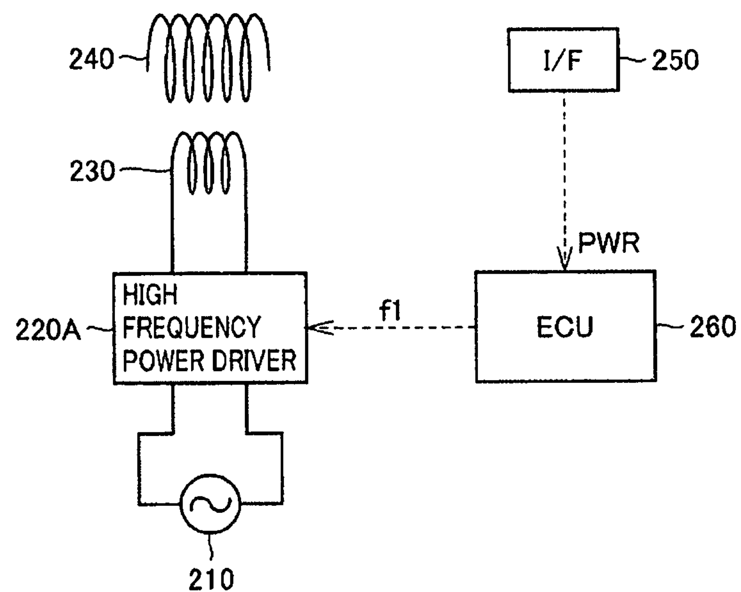
FIG. 15 is a functional block diagram representing a configuration of a power feeding device of FIG. 13.

FIG. 15 is a functional block diagram representing a configuration of power feeding device 200A shown in FIG. 13. Referring to FIG. 15, in a power feeding mode from power feeding device 200A to electrical powered vehicle 100B (FIG. 13), communication device 250 receives charging power PWR of electrical powered vehicle 100B transmitted from communication device 190 (FIG. 13) of electrical powered vehicle 100B, and provides the received charging power PWR to ECU 260.

Figure 16:
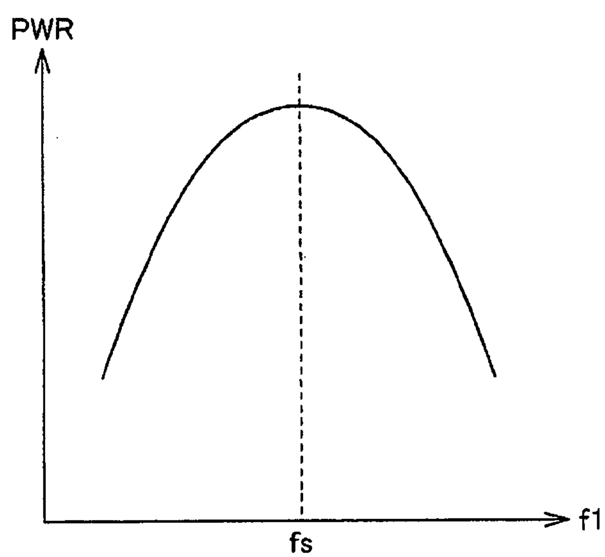
FIG. 16 represents the relationship between the frequency of the high frequency power and charging power.

ECU 260 can set a frequency fl of the high frequency power generated by high frequency power driver 220A, and provides the set frequency fl to high frequency power driver 220A to adjust the frequency of the high frequency power, i.e. resonant frequency. ECU 260 adjusts the frequency of the high frequency power generated by high frequency power driver 220A to the level of fs such that charging power PWR is at a maximum as shown in FIG. 16, based on charging power PWR of electrical powered vehicle 100B received from communication device 250.

High frequency power driver 220A responds to a command from ECU 260 to convert the power received from AC power source 210 into a high frequency power at frequency fs, and provides the high frequency power having the frequency of fs to primary coil 230.

In the fifth embodiment, the power receiving state of electrical powered vehicle 100B is transmitted to power feeding device 200A by communication device 190, and received at communication device 250 of power feeding device 200A. The frequency of the high frequency power generated by high frequency power driver 220A is adjusted by ECU 260 such that charging power PWR of the electrical powered vehicle is at a maximum. According to the fifth embodiment, power can be transferred at high efficiency from power feeding device 200A to electrical powered vehicle 100B even when the vehicle state (loading state, air pressure of tire, and the like) changes.

Sixth Embodiment

The sixth embodiment is based on a configuration in which the electric power supplied from the power feeding device can be adjusted according to the number of electrical powered vehicles receiving power supply from the power feeding device.

Figure 17:
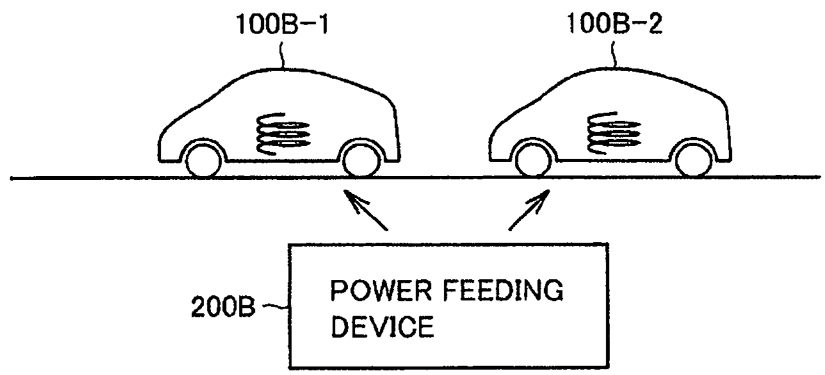
FIG. 17 represents an entire configuration of a charging system according to a sixth embodiment.

FIG. 17 represents an entire configuration of a charging system according to the sixth embodiment. FIG. 17 corresponds to the case where two electrical powered vehicles receive electric power from the power feeding device. However, the number of electrical powered vehicle is not limited thereto.

Referring to FIG. 17, the charging system includes electrical powered vehicles 100B-1 and 100B-2, and a power feeding device 200B. Each of electrical powered vehicles 100B-1 and 100B-2 is based on a configuration similar to that of electrical powered vehicle 100B shown in FIG. 14, and is configured to allow communication with power feeding device 200B by communication device 190 (FIG. 14). Each of electrical powered vehicles 100B-1 and 100B-2 transmits to power feeding device 200B notification of requesting power feeding from power feeding device 200B.

Upon receiving a power feed request from electrical powered vehicles 100B-1 and 100B-2, power feeding device 200B supplies charging power simultaneously to electrical powered vehicles 100B-1 and 100B-2.

Figure 18:
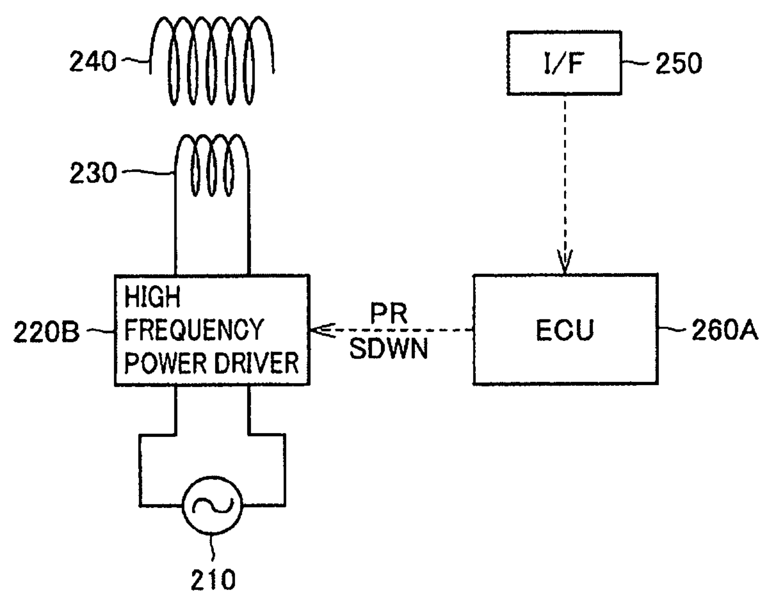
FIG. 18 is a functional block diagram representing a configuration of the power feeding device of FIG. 17.

FIG. 18 is a functional block diagram representing a configuration of power feeding device 200B of FIG. 17. Referring to FIG. 18, power feeding device 200B includes an AC power source 210, a high frequency power driver 220B, a primary coil 230, a primary self-resonant coil 240, a communication device 250, and an ECU 260A.

Communication device 250 receives a power feeding request from electrical powered vehicles 100B-1 and 100B-2. ECU 260A identifies an electrical powered vehicle that is to receive power supply from power feeding device 200B based on the information received by communication device 250. ECU 260A outputs a power command PR to high frequency power driver 220B such that high frequency power is generated according to the number of electrical powered vehicles receiving power supply from power feeding device 200B.

When ECU 260A determines that there is no electrical powered vehicle receiving power supply from power feeding device 200B based on the information received by communication device 250, a shut down command SDWN to stop high frequency power driver 220B is generated and provided to high frequency power driver 220B.

High frequency power driver 220B responds to power command PR from ECU 260A to generate high frequency power according to the number of electrical powered vehicles receiving power supply from power feeding device 200B, and provides the generated high frequency power to primary coil 230.

High frequency power driver 220B stops its operation upon receiving a shut down command SDWN from ECU 260A.

According to the sixth embodiment, an electrical powered vehicle receiving power supply from power feeding device 200B is identified by communication between the power feeding device and an electrical powered vehicle, and high frequency power according to the number of electrical powered vehicles receiving power supply is generated from high frequency power driver 220B. Therefore, the power feeding capability will not be degraded even if there are a plurality of electrical powered vehicle receiving feeding power.

Since high frequency power driver 220B is stopped when determination is made that there is no electrical powered vehicle receiving power supply from power feeding device 200B based on the information received at communication device 250, unnecessary output of power from the power feeding device can be prevented.

Seventh Embodiment

The resonant frequency of the secondary self-resonant coil at the vehicle side is made variable in the second embodiment, whereas the frequency of the high frequency power generated by the high frequency power driver of the power feeding device is made variable in the fifth embodiment. In the seventh embodiment, the resonant frequency of the primary self-resonant coil at the power feeding device side is made variable.

Figure 19:
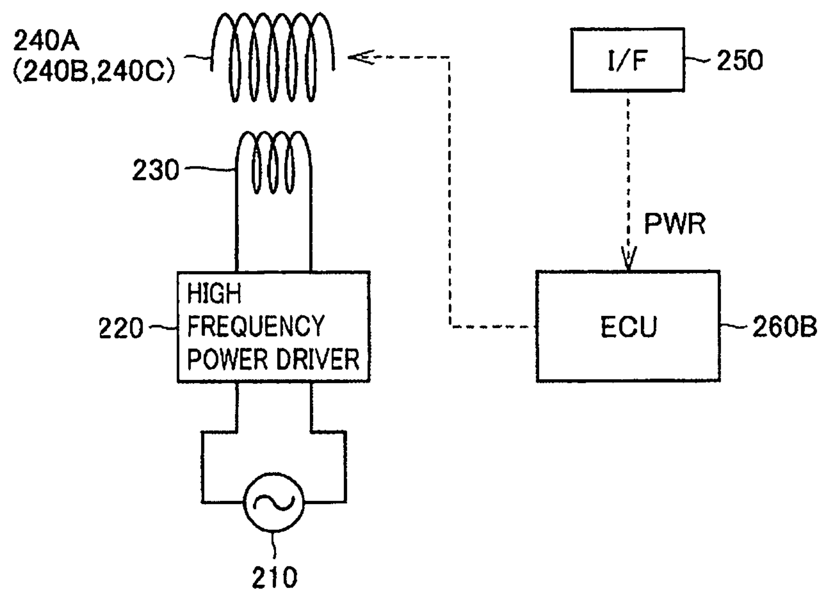
FIG. 19 is functional block diagram representing a configuration of a power feeding device according to a seventh embodiment.

FIG. 19 is a functional block diagram representing a configuration of a power feeding device according to the seventh embodiment. Referring to FIG. 19, power feeding device 200C includes an AC power source 210, a high frequency power driver 220, a primary coil 230, a primary self-resonant coil 240A, a communication device 250, and an ECU 260B.

Primary self-resonant coil 240A is configured to allow modification of its capacitance based on a control signal from ECU 260B. Primary self-resonant coil 240A allows the LC resonant frequency to be modified by altering the capacitance. The configuration of this primary self-resonant coil 240A is similar to that of secondary self-resonant coil 110A shown in FIG. 6.

In a power feeding mode from power feeding device 200C to electrical powered vehicle 100B (FIG. 14), communication device 250 receives charging power PWR of electrical powered vehicle 100B transmitted from communication device 190 (FIG. 14) of electrical powered vehicle 100B, and outputs the received charging power PWR to ECU 260B.

ECU 260B adjusts the LC resonant frequency of primary self-resonant coil 240A by adjusting the capacitance of variable capacitor 112 (FIG. 6) of primary self-resonant coil 240A such that charging power PWR of electrical powered vehicle 100B is at a maximum.

Likewise with the first and second modifications of the second embodiment, a primary self-resonant coil 240B having a configuration similar to that of secondary self-resonant coil 110B shown in FIG. 7, or a primary self-resonant coil 240C having a configuration similar to that of secondary self-resonant coil 110C shown in FIG. 8 may be employed, instead of primary self-resonant coil 240A.

According to the seventh embodiment, the LC resonant frequency of primary self-resonant coil 240A (240B, 240C) may be adjusted. The LC resonant frequency of primary self-resonant coil 240A (240B, 240C) is adjusted by ECU 260B such that the charging power of the electrical powered vehicle receiving power supply from power feeding device 200C is at a maximum. Therefore, according to the seventh embodiment, the efficiency of power transfer from power feeding device 200C to an electrical powered vehicle can be maintained even if the state of the vehicle (loading state, air pressure of tire, and the like) changes.

Eighth Embodiment

In the eighth embodiment, a plurality of sets of primary self-resonant coils and primary coils are provided on the power feeding device side.

Figure 20:
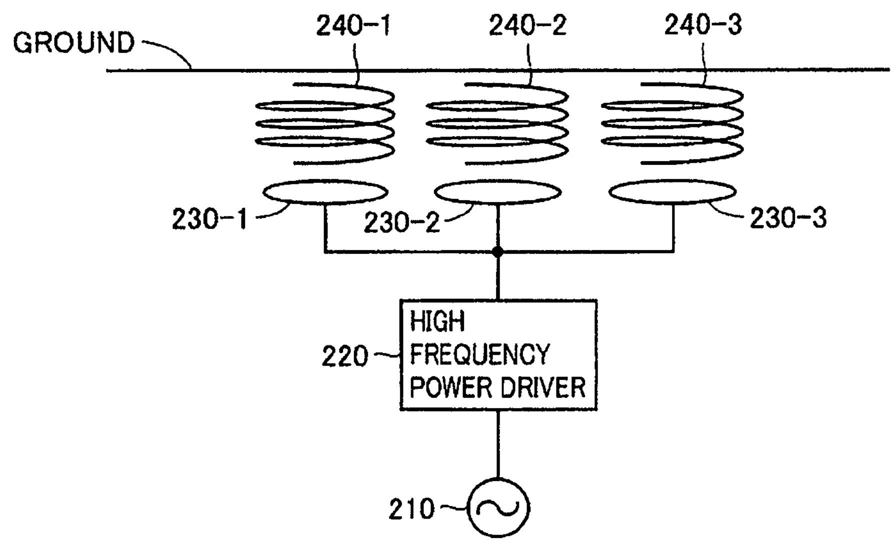
FIG. 20 represents a configuration of a power feeding device according to an eighth embodiment.

FIG. 20 represents a configuration of a power feeding device according to the eighth embodiment. FIG. 20 is based on an example in which there are, but not limited to, three sets of primary self-resonant coils and primary coils.

Referring to FIG. 20, power feeding device 200D includes an AC power source 210, a high frequency power driver 220, primary coils 230-1, 230-2, and 230-3, and primary self-resonant coils primary coils 240-1, 240-2, and 240-3.

Primary self-resonant coils primary coils 240-1, 240-2, and 240-3 are disposed parallel to the ground. Primary coils 230-1, 230-2, and 230-3 are provided corresponding to primary self-resonant coils 240-1, 240-2, and 240-3, respectively, and connected parallel to each other with respect to high frequency power driver 220.

In the eighth embodiment, the current from high frequency power driver 220 flows in a concentrated manner to a primary coil corresponding to the primary self-resonant coil having the lowest magnetic resistance with the secondary self-resonant coil of the electrical powered vehicle receiving power supply from power feeding device 200D. Therefore, electric power can be supplied from the power supply device to the electrical powered vehicle reliably and sufficiently even if the halting position of the vehicle is deviated from a defined position.

Ninth Embodiment

Likewise with the eighth embodiment, the ninth embodiment has a plurality of sets of primary self-resonant coils and primary coils provided at the power feeding device. In contrast to the eighth embodiment having a primary self-resonant coil and primary coil selected passively, the ninth embodiment has a primary self-resonant coil and primary coil selected positively such that the charging power is at a maximum at the electrical powered vehicle receiving power supply from the power feeding device.

Figure 21:
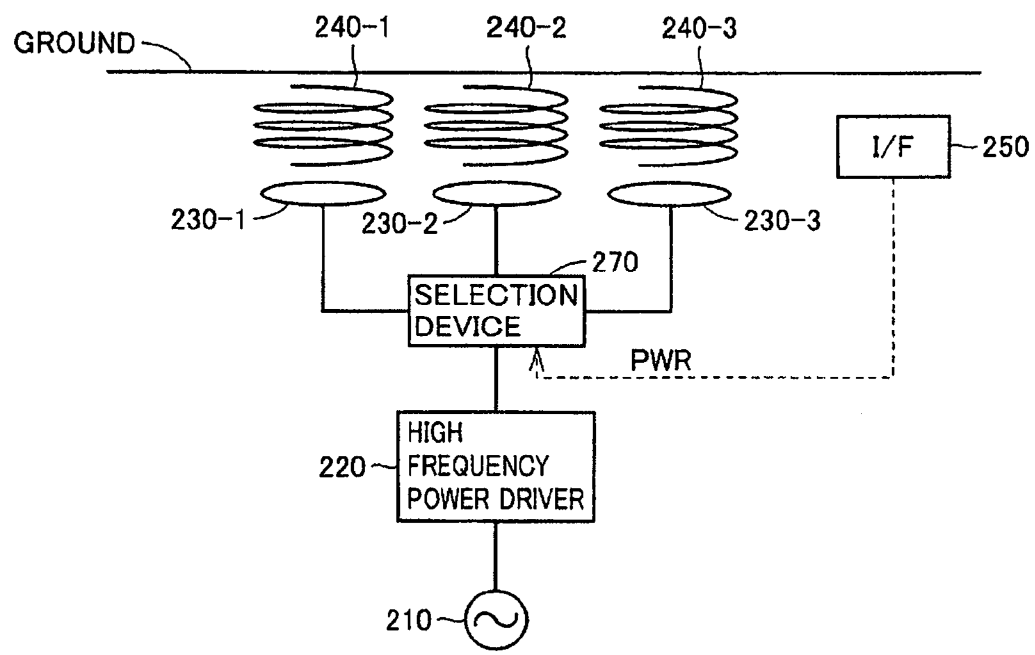
FIG. 21 represents a configuration of a power feeding device according to a ninth embodiment.

FIG. 21 represents a configuration of a power feeding device according to the ninth embodiment. Referring to FIG. 21, a power feeding device 200E is based on the configuration of power feeding device 200D of the eighth embodiment shown in FIG. 20, and additionally includes a communication device 250 and a selection device 270.

In a power feeding mode from power feeding device 200E to electrical powered vehicle 100B (FIG. 14), communication device 250 receives charging power PWR of electrical powered vehicle 100B transmitted from communication device 190 (FIG. 14) of electrical powered vehicle 100B.

Selection device 270 is connected between primary coils 230-1, 230-2, and 230-3 and high frequency power driver 220 to select and electrically connect with high frequency power driver 220 any one of primary coils 230-1, 230-2, and 230-3. Selection device 270 selects a set of the primary self-resonant coil and primary coil that provides the maximum charging power PWR based on charging power PWR of electrical powered vehicle 100B received from communication device 250, and connects the selected primary coil with high frequency power driver 220.

In the ninth embodiment, power can be transmitted reliably and sufficiently from the power feeding device to the electrical powered vehicle even if the halting position of the vehicle is deviated from the defined position, likewise with the eighth embodiment.

Tenth Embodiment

The eighth embodiment set forth above is based on the case where a set of a primary self-resonant coil and primary coil is provided in plurality. Only the primary self-resonant coil may be provided in plurality.

Figure 22:
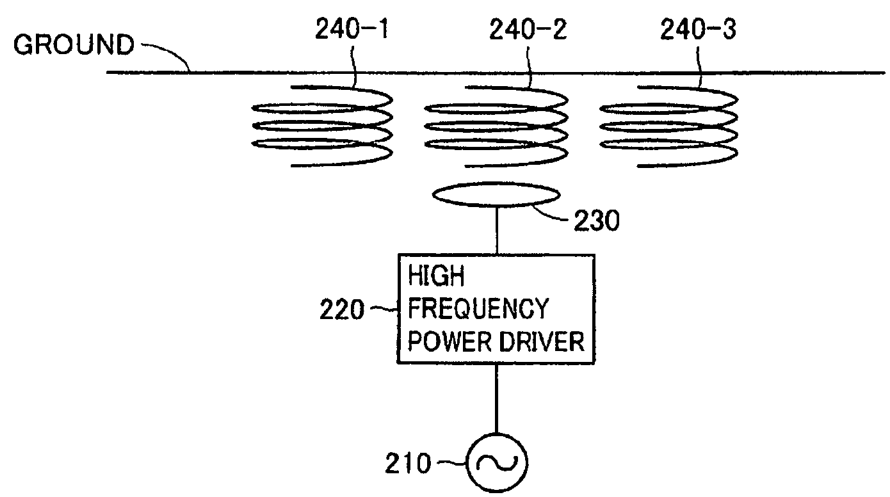
FIG. 22 represents a configuration of a power feeding device according to a tenth embodiment.

FIG. 22 represents a configuration of the power feeding device according to the tenth embodiment. FIG. 22 is based on an example in which there are, but not limited to, three primary self-resonant coils.

Referring to FIG. 22, a power feeding device 200F includes an AC power source 210, a high frequency power driver 220, a primary coil 230, and primary self-resonant coils 240-1, 240-2, and 240-3.

Primary self-resonant coils 230-1, 230-2, and 230-3 are disposed parallel to the ground. Primary coil 230 is provided corresponding to primary self-resonant coil 240-2, and connected to high frequency power driver 220.

Since the leakage of electric power not transmitted by primary self-resonant coil 240-2 can be transferred to another primary self-resonant coil in the tenth embodiment, the transmission efficiency can be improved.

Eleventh Embodiment

In the eleventh embodiment, only the primary coils are provided in plurality.

Figure 23:
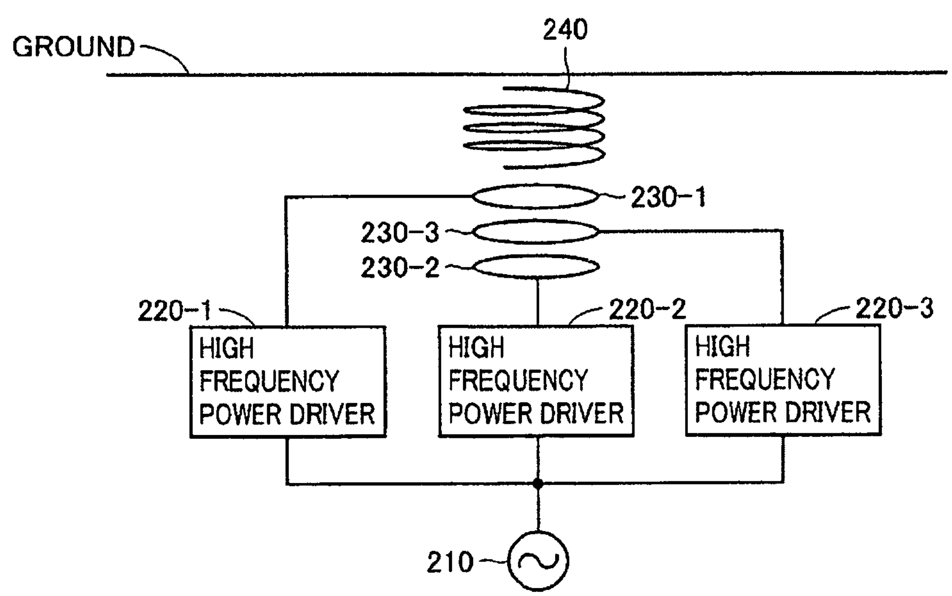
FIG. 23 represents a configuration of a power feeding device according to an eleventh embodiment.

FIG. 23 represents a configuration of a power feeding device of the eleventh embodiment. FIG. 23 is based on an example in which there are, but not limited to, three sets of primary coils and high frequency power drivers.

Referring to FIG. 23, a power feeding device 200G includes an AC power source 210, high frequency power drivers 220-1, 220-2, and 220-3, primary coils 230-1, 230-2, and 230-3, and a primary self-resonant coil 240.

Primary coils 230-1, 230-2, and 230-3 are arranged coaxial with primary self-resonant coil 240, and connected to high frequency power drivers 220-1, 220-2, and 220-3, respectively. High frequency power drivers 220-1, 220-2, and 220-3 are connected parallel to AC power source 210, and output the high frequency power to primary coils 230-1, 230-2, and 230-3, respectively.

In the eleventh embodiment, high power is provided to primary self-resonant coil 240 by a plurality of high frequency power drivers 220-1, 220-2, and 220-3, and primary coils 230-1, 230-2, and 230-3. Therefore, high power can be transferred from power feeding device 200G to an electrical powered vehicle in the eleventh embodiment.

In each of the embodiments set forth above, a converter for boosting or down-converting voltage based on the voltage of power storage device 140 may be provided between rectifier 130 and power storage device 140. Alternatively, a transformer for voltage conversion based on the voltage of power storage device 140 may be provided between secondary coil 120 and rectifier 130. Alternatively, an AC/DC converter for alternating current/direct current conversion based on the voltage of power storage device 140 may be provided instead of rectifier 130.

In a vehicle running mode in each of the embodiments set forth above, system main relay SMR1 is turned on and system main relay SMR2 is turned off by rendering signal SE1 active and rendering signal SE2 inactive, respectively. In a charging mode of power storage device 140 from AC power source 210 external to the vehicle, system main relay SMR1 is turned off by rendering signal SE1 inactive and system main relay SMR2 is turned on by rendering signal SE2 active. However, signals SE1 and SE2 may be rendered active at the same time to simultaneously turn on system main relays SMR1 and SMR2. Accordingly, it is possible to charge power storage device 140 from an AC power source 210 external to the vehicle even during driving.

Each of the embodiments set forth above is based on a series/parallel type hybrid vehicle having the power of engine 170 split by power split device 172 for transmission to driving wheel 174 and motor generator 162. The present invention is also applicable to other types of hybrid vehicles. For example, the present invention is also applicable to the so-called series type hybrid vehicle using engine 170 only to drive motor generator 162 and generating the driving force of the vehicle by means of motor generator 164 alone, to a hybrid vehicle having only the regenerative energy among the kinetic energy generated by engine 170 to be collected as electric energy, as well as to a motor assist type hybrid vehicle with the engine as the main driving source and assisted by a motor, as necessary.

Further, the present invention is also applicable to a hybrid vehicle absent of a boost converter 152.

Moreover, the present invention is applicable to an electric car that runs only with an electric power, absent of an engine 170, and also to a fuel cell vehicle further including a fuel cell in addition to a power storage device as the DC power source.

In the above description, motor generator 164 corresponds to an example of "electric motor" of the present invention. Reflective walls 410 and 420 correspond to an example of "reflective means" of the present invention. Variable capacitor 112, variable capacitive diode 114, and switch 118 correspond to an example of "adjustment device" of the present invention. Voltage sensor 182, current sensor 184, and vehicle ECU 180A correspond to an example of "electric power detection device" of the present invention.

Further, vehicle ECU 180A corresponds to an example of "control device for controlling an adjustment device" of the present invention. System main relays SMR1 and SMR2 correspond to an example of "first relay" and "second relay", respectively, of the present invention. ECU 260A correspond to an example of "control device for controlling a high frequency power driver" of the present invention. ECU 260B corresponds to an example of "a control device for controlling an adjustment device" of the present invention.

The embodiments disclosed herein may be implemented based on an appropriate combination thereof. It should be understood that each of the embodiments disclosed herein are illustrative and non-restrictive in every respect. The scope of the present invention is defined by the appended claims, rather than the description set forth above, and all changes that fall within limits and bounds of the claims, or equivalence thereof are intended to be embraced by the claims.

The invention claimed is:

1. A power transfer system in which electric power is transferred from a power feeding device external to a vehicle to a power receiving device mounted on the vehicle in a contactless manner, the power feeding device comprising:

a high frequency power driver configured to convert electric power received from a power source into high frequency power;

a transmitting coil configured to be magnetically coupled with a receiving coil mounted on the vehicle by a magnetic field, and to transmit the high frequency power received from the high frequency power driver; and a first reflective wall formed at a rear side of the transmitting coil with respect to a power transferring direction from the transmitting coil, to allow reflection of a magnetic flux output from the transmitting coil in the power transferring direction, the transmitting coil and the first reflective wall being arranged spaced apart from each other, the power receiving device comprising:

the receiving coil configured to be magnetically coupled with the transmitting coil by a magnetic field, and to receive electric power from the transmitting coil; and a second reflective wall formed at a rear side of the receiving coil with respect to a power receiving direction from the transmitting coil, to allow reflection of a magnetic flux output from the transmitting coil to the receiving coil, the receiving coil and the second reflective wall being arranged spaced apart from each other.

2. The power transfer system according to claim 1, wherein the transmitting coil is disposed in proximity to the ground, and at least a portion of the first reflective wall is disposed at a side deeper in the ground than the transmitting coil.

3. The power transfer system according to claim 1, wherein the power feeding device further comprises:

a first communication device configured to allow reception of a detection value of reception power transmitted from the vehicle receiving power supply from the power feeding device; and a control device configured to adjust a frequency of the high frequency power by controlling the high frequency power driver such that the reception power is at a maximum based on the detection value of the reception power received by the first communication device.

4. The power transfer system according to claim 1, wherein the power feeding device further comprises:

a first communication device configured to allow reception of information transmitted from the vehicle receiving power supply from the power feeding device; and a control device configured to control the high frequency power driver such that the high frequency power is generated according to a number of vehicles receiving power supply from the power feeding device, based on the information received by the first communication device.

5. The power transfer system according to claim 4, wherein the control device stops the high frequency power driver when a determination is made that there is no vehicle receiving power supply from the power feeding device.

6. The power transfer system according to claim 1, wherein the power feeding device further comprises an adjustment device configured to allow adjustment of a resonant frequency of the transmitting coil by modifying at least one of a capacitance and inductance of the transmitting coil.

7. The power transfer system according to claim 6, wherein the power feeding device further comprising:

a first communication device configured to allow reception of a detection value of reception power transmitted from the vehicle receiving power supply from the power feeding device; and a control device configured to control the adjustment device such that the reception power is at a maximum based on the detection value of the reception power received by the first communication device.

8. The power transfer system according to claim 1, wherein the power feeding device further comprises:

a primary coil for receiving the high frequency power from the high frequency power driver and transmitting the received high frequency power to the transmitting coil by electromagnetic induction; and a first communication device configured to allow reception of a detection value of reception power transmitted from the vehicle receiving power supply from the power feeding device, wherein a plurality of sets of the transmitting coil and the primary coil are provided, the power feeding device further comprising a selection device configured to select, among the plurality of primary coils, a primary coil receiving the high frequency power from the high frequency power driver, and connecting the selected primary coil with the high frequency power driver such that the reception power is at a maximum based on the detection value of the reception power received by the first communication device.

9. The power transfer system according to claim 1, wherein the power feeding device further comprises a primary coil for receiving the high frequency power from the high frequency power driver and transmitting the received high frequency power to the transmitting coil by electromagnetic induction, wherein a plurality of sets of the transmitting coil and the primary coil are provided, and the plurality of primary coils are connected parallel with each other with respect to the high frequency power driver.

10. The power transfer system according to claim 1, wherein at least a portion of the second reflective wall is disposed at a side farther away from a body face of the vehicle located closest to the receiving coil, than the receiving coil.

11. The power transfer system according to claim 1, wherein the receiving coil is disposed at a lower portion of a body of the vehicle, and at least a portion of the second reflective wall is disposed at an upper side of the body of the vehicle relative to the receiving coil.

12. The power transfer system according to claim 1, wherein the vehicle includes:

a rectifier configured to rectify electric power received by the receiving coil; and a power storage device configured to store electric power rectified by the rectifier, the number of windings of the receiving coil is set based on a voltage of the power storage device, a distance between the transmitting coil and the receiving coil, and a resonant frequency of the transmitting coil and the receiving coil.

13. The power transfer system according to claim 1, wherein the power receiving device further comprises an adjustment device configured to allow adjustment of a resonant frequency of the receiving coil by modifying at least one of a capacitance and an inductance of the receiving coil.

14. The power transfer system according to claim 13, wherein the power receiving device further comprises:

an electric power detection device configured to detect electric power received by the receiving coil; and a control device configured to control the adjustment device such that electric power detected by the electric power detection device is at a maximum.

15. The power transfer system according to claim 1, wherein the power receiving device further comprises:

an electric power detection device configured to detect electric power received by the receiving coil; and a second communication device configured to allow transmission of a detection value of electric power detected by the electric power detection device to the power feeding device and including the transmitting coil.

16. The power transfer system according to claim 1, wherein the receiving coil is disposed at a lower portion of a body of the vehicle.

17. The power transfer system according to claim 1, wherein the vehicle includes a rectifier configured to rectify electric power received by the receiving coil, a plurality of the receiving coils are provided, and the plurality of receiving coils are connected to the rectifier parallel with each other.

18. The power transfer system according to claim 1, wherein the vehicle includes:

a rectifier configured to rectify electric power received by the receiving coil; and a power storage device configured to store electric power rectified by the rectifier, the power receiving device further comprising a voltage converter arranged between the receiving coil and the power storage device to carry out a boosting operation or a down-converting operation based on a voltage of the power storage device.

19. The power transfer system according to claim 1, wherein the vehicle includes:

a rectifier configured to rectify electric power received by the receiving coil;

a power storage device configured to store electric power rectified by the rectifier; and an electric motor configured to receive supply of electric power from the power storage device to generate a driving force of the vehicle, the power receiving device further comprising:

a first relay disposed between the power storage device and the electric motor; and a second relay disposed between the power storage device and the receiving coil, wherein, when the first relay is turned on and the electric motor is driven by electric power of the power storage device, the second relay is turned on together with the first relay.

* * * * *